(12) United States Patent
Deshpande et al.

(10) Patent No.: US 8,588,773 B2
(45) Date of Patent: Nov. 19, 2013

(54) SYSTEM AND METHOD FOR CELL SEARCH AND SELECTION IN A WIRELESS COMMUNICATION SYSTEM

(75) Inventors: Manoj M. Deshpande, San Diego, CA (US); Sanjiv Nanda, Ramona, CA (US); Jen Mei Chen, San Diego, CA (US); Francesco Pica, San Diego, CA (US); Parag A. Agashe, San Diego, CA (US); Gavin B. Horn, La Jolla, CA (US); Rajat Prakash, La Jolla, CA (US); Nathan E. Tenny, Poway, CA (US); Aziz Gholmieh, Del Mar, CA (US); Srinivasan Balasubramanian, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 12/511,904

(22) Filed: Jul. 29, 2009

(65) Prior Publication Data

US 2010/0029274 A1  Feb. 4, 2010

Related U.S. Application Data

(60) Provisional application No. 61/086,113, filed on Aug. 4, 2008, provisional application No. 61/086,223, filed on Aug. 5, 2008, provisional application No. 61/086,337, filed on Aug. 5, 2008, provisional application No. 61/095,601, filed on Sep. 9, 2008.

(51) Int. Cl.
*H04W 4/00* (2009.01)

(52) U.S. Cl.
USPC .......................................... 455/434; 370/328

(58) Field of Classification Search
USPC ............ 455/422.1, 432.1, 434; 370/328, 329, 370/341
See application file for complete search history.

(56) References Cited

U.S. PATENT DOCUMENTS

| | | |
|---|---|---|
| 5,535,424 A | 7/1996 | De Seze et al. |
| 5,640,677 A | 6/1997 | Karlsson |

(Continued)

FOREIGN PATENT DOCUMENTS

| | | |
|---|---|---|
| CN | 1110457 A | 10/1995 |
| CN | 1675954 A | 9/2005 |

(Continued)

OTHER PUBLICATIONS

3GPP TS 36.304 v8.0.0: "3rd Generation Partnership Project; Technical Specification Group Radio Access Network; Evolved Universal Terrestrial Radio Access (E-UTRA); User Equipment (UE) procedures in idle mode (Realease 8)," [Online] (Dec. 1, 2007), pp. 1-27, XP002524390.

(Continued)

*Primary Examiner* — Ajit Patel
(74) *Attorney, Agent, or Firm* — François A. Pelaez

(57) ABSTRACT

Systems and methodologies are described herein that facilitate improved cell search and selection in a wireless communication system. For example, a terminal as described herein can utilize one or more Closed Subscriber Group (CSG)-specific offset and/or hysteresis parameters as described herein to increase the amount of time on which the terminal is allowed to camp on a desirable cell. Additionally, specialized reselection timing can be employed as described herein to increase a delay associated with selecting a Home Node B (HNB) or Home Evolved Node B (HeNB) cell, thereby reducing power consumption associated with rapid cell reselection operations in a densely populated network environment. Further, a two-step reselection process can be performed as described herein in the context of selecting a frequency for cell reselection, thereby mitigating the effects of rapid reselection between cells and/or frequencies due to CSG cell prioritization.

34 Claims, 21 Drawing Sheets

(56) References Cited

U.S. PATENT DOCUMENTS

| | | |
|---|---|---|
| 5,722,072 A | 2/1998 | Crichton et al. |
| 5,778,316 A | 7/1998 | Persson et al. |
| 5,896,373 A | 4/1999 | Mitts et al. |
| 5,930,710 A | 7/1999 | Sawyer et al. |
| 6,067,460 A | 5/2000 | Alanara et al. |
| 6,151,484 A | 11/2000 | Ramesh |
| 6,516,193 B1 | 2/2003 | Salmela et al. |
| 6,529,491 B1 | 3/2003 | Chang et al. |
| 6,717,925 B1 | 4/2004 | Leppisaari et al. |
| 6,751,460 B2 | 6/2004 | Korpela et al. |
| 6,792,284 B1 | 9/2004 | Dalsgaard et al. |
| 7,047,009 B2 | 5/2006 | Laroia et al. |
| 7,289,473 B1 | 10/2007 | Padovani et al. |
| 7,379,739 B2 | 5/2008 | Rajkotia et al. |
| 7,480,265 B2 | 1/2009 | Cromer et al. |
| 7,512,110 B2 | 3/2009 | Sayeedi et al. |
| 7,706,793 B2 | 4/2010 | Zhang |
| 7,742,498 B2 | 6/2010 | Barzegar et al. |
| 7,869,792 B1 * | 1/2011 | Zhou et al. .................. 455/411 |
| 7,925,259 B2 | 4/2011 | Nylander et al. |
| 7,929,970 B1 | 4/2011 | Gunasekara et al. |
| 7,937,086 B2 | 5/2011 | Chen et al. |
| 8,032,153 B2 | 10/2011 | Dupray et al. |
| 2003/0051132 A1 | 3/2003 | Kobayashi et al. |
| 2003/0134642 A1 | 7/2003 | Kostic et al. |
| 2003/0220075 A1 | 11/2003 | Baker et al. |
| 2004/0009779 A1 | 1/2004 | Qu et al. |
| 2004/0082328 A1 | 4/2004 | Japenga et al. |
| 2004/0136340 A1 | 7/2004 | Sanchez et al. |
| 2004/0198220 A1 | 10/2004 | Whelan et al. |
| 2004/0202131 A1 | 10/2004 | An et al. |
| 2005/0037798 A1 | 2/2005 | Yamashita et al. |
| 2005/0099998 A1 | 5/2005 | Semper |
| 2005/0202823 A1 | 9/2005 | Shaheen et al. |
| 2005/0245260 A1 | 11/2005 | Nielsen et al. |
| 2006/0025127 A1 | 2/2006 | Cromer et al. |
| 2006/0040700 A1 | 2/2006 | Roberts et al. |
| 2006/0148479 A1 | 7/2006 | Park et al. |
| 2006/0173976 A1 | 8/2006 | Vincent et al. |
| 2006/0184680 A1 | 8/2006 | Ruutu et al. |
| 2006/0189308 A1 | 8/2006 | Kurata et al. |
| 2006/0233150 A1 | 10/2006 | Cherian |
| 2006/0258354 A1 | 11/2006 | Ul Haq |
| 2006/0268746 A1 | 11/2006 | Wijting et al. |
| 2006/0268800 A1 | 11/2006 | Sugaya et al. |
| 2006/0276201 A1 | 12/2006 | Dupray |
| 2007/0054666 A1 | 3/2007 | Choi |
| 2007/0097938 A1 | 5/2007 | Nylander et al. |
| 2007/0098053 A1 | 5/2007 | Rinne et al. |
| 2007/0104166 A1 | 5/2007 | Rahman et al. |
| 2007/0189241 A1 | 8/2007 | Zhang |
| 2007/0232307 A1 | 10/2007 | Ibrahim et al. |
| 2007/0249291 A1 | 10/2007 | Nanda et al. |
| 2008/0004025 A1 | 1/2008 | Lee |
| 2008/0039099 A1 | 2/2008 | An et al. |
| 2008/0069065 A1 | 3/2008 | Wu et al. |
| 2008/0132239 A1 | 6/2008 | Khetawat et al. |
| 2008/0192696 A1 | 8/2008 | Sachs et al. |
| 2008/0267114 A1 | 10/2008 | Mukherjee et al. |
| 2008/0287134 A1 | 11/2008 | Catovic et al. |
| 2008/0299975 A1 | 12/2008 | Sanchez et al. |
| 2008/0305801 A1 | 12/2008 | Burgess et al. |
| 2009/0047954 A1 | 2/2009 | Tenny et al. |
| 2009/0047955 A1 | 2/2009 | Frenger et al. |
| 2009/0052395 A1 | 2/2009 | Bao et al. |
| 2009/0086672 A1 | 4/2009 | Gholmieh et al. |
| 2009/0124284 A1 | 5/2009 | Scherzer et al. |
| 2009/0129327 A1 | 5/2009 | Horn et al. |
| 2009/0129338 A1 | 5/2009 | Horn et al. |
| 2009/0135784 A1 | 5/2009 | Horn et al. |
| 2009/0137228 A1 | 5/2009 | Horn et al. |
| 2009/0137249 A1 | 5/2009 | Horn et al. |
| 2009/0252113 A1 | 10/2009 | Take |
| 2009/0253432 A1* | 10/2009 | Willey et al. .................. 455/435.2 |
| 2009/0280819 A1 | 11/2009 | Brisebois et al. |
| 2010/0008230 A1 | 1/2010 | Khandekar et al. |
| 2010/0027510 A1 | 2/2010 | Balasubramanian et al. |
| 2010/0110945 A1* | 5/2010 | Koskela et al. .................. 370/310 |
| 2010/0184439 A1 | 7/2010 | Chen et al. |
| 2010/0227645 A1 | 9/2010 | Keevill et al. |
| 2010/0323663 A1* | 12/2010 | Vikberg et al. .................. 455/410 |
| 2011/0263260 A1 | 10/2011 | Yavuz et al. |

FOREIGN PATENT DOCUMENTS

| | | |
|---|---|---|
| CN | 1675956 A | 9/2005 |
| CN | 1701584 A | 11/2005 |
| CN | 1842210 A | 10/2006 |
| CN | 1964522 A | 5/2007 |
| CN | 101015221 A | 8/2007 |
| DE | 19510256 | 9/1995 |
| EP | 0589552 | 3/1994 |
| EP | 1670179 | 6/2006 |
| EP | 1699253 | 9/2006 |
| EP | 1717993 | 11/2006 |
| EP | 1775976 A1 | 4/2007 |
| EP | 1835780 | 9/2007 |
| EP | 2077690 | 7/2009 |
| JP | 8501430 | 2/1996 |
| JP | 2003506960 A | 2/2003 |
| JP | 2003116162 A | 4/2003 |
| JP | 2004159304 A | 6/2004 |
| JP | 2004166273 A | 6/2004 |
| JP | 2004260824 A | 9/2004 |
| JP | 2006148836 A | 6/2006 |
| JP | 2007104417 A | 4/2007 |
| JP | 2007534227 A | 11/2007 |
| JP | 2009504050 A | 1/2009 |
| JP | 2009510973 A | 3/2009 |
| KR | 100711531 | 4/2007 |
| RU | 2145774 C1 | 2/2000 |
| RU | 2199834 C2 | 2/2003 |
| RU | 2005129268 A | 3/2007 |
| RU | 2308810 | 10/2007 |
| WO | WO02080600 | 10/2002 |
| WO | WO02087275 | 10/2002 |
| WO | WO03009633 A1 | 1/2003 |
| WO | WO2004019643 | 3/2004 |
| WO | WO2004054310 | 6/2004 |
| WO | WO2005065214 A2 | 7/2005 |
| WO | WO2005122621 A1 | 12/2005 |
| WO | WO2007015066 A2 | 2/2007 |
| WO | WO2007015071 A2 | 2/2007 |
| WO | WO2007040452 | 4/2007 |
| WO | WO2007040454 A2 | 4/2007 |
| WO | WO2007075954 | 7/2007 |
| WO | WO2007080490 | 7/2007 |
| WO | WO2007096763 A2 | 8/2007 |
| WO | WO2007097672 | 8/2007 |
| WO | WO2007097673 | 8/2007 |
| WO | WO2008030956 | 3/2008 |
| WO | WO2008124282 | 10/2008 |
| WO | WO2009007720 | 1/2009 |
| WO | WO2009053710 | 4/2009 |
| WO | WO2009064931 | 5/2009 |

OTHER PUBLICATIONS

ETSI TS 125.304 V7.1.0: "Universal Mobile Telecommunications System (UMTS); User Equipment (UE) procedures in idle mode and procedures for cell reselection in connected mode (3GPP TS 25.304 version 7.1.0 Release 7)" ETSI Standards, Sophia Antipolis Cedex, France, (Dec. 1, 2006), XP014039981.
International Search Report and Written Opinion—PCT/US2009/052738—International Search Authority, European Patent Office, Aug. 12, 2009.
Jung, Young-Ho et al: "PN offset Planning for Synchronous CDMA Based Fiber-Optic Microcellular Systems," Vehicular Technology Conference Proceedings, 2000. Internet Citation, (May 2000), pp. 2275-2279, XP002480275 [retrieved on May 15, 2000] paragraphs [0001]—[00V1], doi: 10.1109/VETECS.2000.851678.
Qualcomm Europe: "Implicit Priority for CSG cells," 3GPP TSG-RAN WG2 #63bis, R2-086586, (Nov. 10, 2008), XP002557108.

(56) References Cited

OTHER PUBLICATIONS

Qualcomm Europe: "Linger timer for HeNB reselection to improve standby time of UE in mobility situations," 3GPP Draft TSG-RAN WG2 meeting #63; R2-084155, 3rd Generation Partnership Project (3GPP), Jeju, Korea; (Aug. 12, 2008), XP050319291.
Qualcomm Europe: "Linger Timer for HNB Cell Reselection," 3GPP Draft TSG-RAN WG2 meeting #63; R2-084342, 3rd Generation Partnership Project (3GPP), Jeju, Korea, (Aug. 22, 2008), XP050319418.
Qualcomm Europe: "Parameter for HNB White List Cell Selection," 3GPP Draft TSG-RAN WG2 meeting #63; R2-084552, 3rd Generation Partnership Project (3GPP), Jeju, Korea (Aug. 18, 2008), XP050319589.
Qualcomm Europe: "UTRA HNB Idle Mode (Re)selection," 3GPP Draft TSG-RAN WG2 #62bis; R2-084347, 3rd Generation Partnership Project (3GPP), Jeju, Korea (Aug. 18, 2008), XP050319423.
Rapporteur (Huawei): "Email report on Home-(e)NB mobility, main issues [63_LTE_C01,]" 3GPP Draft TSG-RAN2 Meeting #63bis; R2-085705, 3rd Generation Partnership Project (3GPP), Prague, Czech Republic; (Oct. 1, 2008), XP050320478.
3GPP TR 24.801: "Pseudo-CR on Allowed CSG List update," 3GPP TSG CT WG1 meeting #55; C2-083427, v 1.1.1, Budapast, Hungary, Aug. 18-22, 2008.
ASUSTeK, "CSG related system information and CSG subscription information", 3GPP TSG-RAN WG2 #60, R2-075133, Nov. 9, 2007.
Ericsson, "Idle state access restriction for CSGs", 3GPP TSG-RAN WG2 #60, Tdoc R2-074684, Nov. 9, 2007, <URL:http://www.3gpp.org/ftp/tsg_ran/WG2_RL2/TSGR2_60/Docs/R2-074684.zip>.
NTT Docomo, et al., "CSG with limited open access" 3GPP Draft; R2-075150 CSG With Limited Open Access, 3rd Generation Partnership Project (3GPP), Mobile Competence Centre ; 650, Route Des Lucioles ; F-06921 Sophia-Antipolis Cedex ; France, vol. RAN WG2, no. Jeju; 20071112, Nov. 12, 2007, XP050137597 [retrieved on Nov. 12, 2007] the whole document.
Vodafone, "GERAN to LTE Handover: Home Cell Deployment Considerations", 3GPP Workshop GERAN/RAN, TDoc GR-070020, Sep. 28, 2007.
Vodafone Group: "Signalling on a CSG Cell" 3GPP Draft; R2-072831, 3rd Generation Partnership Project (3GPP), Mobile Competence Centre ; 650, Route Des Lucioles ; F-06921 Sophia-Antipolis Cedex ; France, vol. RAN WG2, no. Orlando, USA; 20070702, Jul. 2, 2007, XP050135608.
NTT Docomo et al: "Cell ID Assignment for Home Node B" 3GPP Draft; R2-073374, 3rd Generation Partnership Project (3GPP), Mobile Competence Centre ; 650, Route Des Lucioles ; F-06921 Sophia-Antipolis Cedex ; France, Athens, Greece, vol. R2-073374, No. 59, Aug. 20, 2007, pp. 1-5, XP002541822 the whole document.
Panasonic, "CSG Cell Prioritization by UE", 3GPP TSG RAN WG2 #59 R2-073282, Aug. 20, 2007.
T-Mobile, Report on emial discussion "Home Cells (1)—General concepts & solutions for LTE", 3GPP TSG RAN WG2 #60 R2-074904, Nov. 5, 2007.
Ericsson: "Idle state access restriction for home eNB", R2-073415, 3GPP TSG-RAN WG2#59, Aug. 24, 2007.
"Evolved Universal Terrestrial Radio Access (E-UTRA) and Evolved Universal Terrestrial Radio Access (E-UTRAN); Overall description; Stage 2 (3GPP Ts 36.300 version 8.4.0 Release 8); ETSI TS 136 300", ETSI Standards, Lis, Sophia Antipolis Cedex, France, vol. 3-R2, No. V8.4.0, Apr. 1, 2008, XP014041816, ISSN: 0000-0001 chapters: 10.1.1.2; 10.1.3; 10.1.3.2.
Taiwan Search Report—TW098126239—TIPO—Jan. 15, 2013.

\* cited by examiner

SYSTEM AND METHOD FOR CELL SEARCH AND SELECTION IN A WIRELESS COMMUNICATION SYSTEM

CROSS-REFERENCE

This application claims the benefit of U.S. Provisional Application Ser. No. 61/086,223, filed Aug. 5, 2008, and entitled "IDLE MODE PARAMETERS FOR HeNB DETECTION AND CAMPING"; U.S. Provisional Application Ser. No. 61/086,337, filed Aug. 5, 2008, and entitled "IDLE MODE PARAMETERS FOR HeNB DETECTION AND CAMPING"; U.S. Provisional Application Ser. No. 61/095,601, filed Sep. 9, 2008, and entitled "IMPROVED SEARCH AND SELECTION OF CLOSED SUBSCRIBER GROUP (CSG) FEMTO CELLS"; and U.S. Provisional Application Ser. No. 61/086,113, filed Aug. 4, 2008, and entitled "SYSTEM AND METHOD FOR ENHANCED IDLE HANDOFF TO SUPPORT FEMTO CELLS." The aforementioned applications are incorporated herein by reference in their entireties.

BACKGROUND

I. Field

The present disclosure relates generally to wireless communications, and more specifically to techniques for search and selection of network cells in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices.

In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

In a wireless network deployment with Home Node B (HNB) cells (e.g., access point base stations, femto cells, Home Evolved Node B (HeNB) cells, etc.), a terminal (e.g., a user equipment unit (UE), mobile terminal, access terminal, etc.) can be provisioned with a whitelist of allowed cells associated with a closed subscriber group (CSG) associated with the terminal. In some network implementations, a CSG cell can be associated with various special billing and/or other service benefits such that respective terminals having the CSG cell in its whitelist can leverage respective benefits provided by cell upon connection. Accordingly, in some cases it would be desirable to implement techniques for optimizing the extent to which respective benefits of a CSG cell can be leveraged by respective associated terminals.

Further, in some geographic areas, a wireless communication network deployment can utilize a significant number of cells (e.g., macro cells, pico cells, femto cells, etc.) that provide coverage for respective overlapping areas of service. In addition, respective cells providing coverage for a given geographic area can operate on a significant amount of frequency bands, sub-carriers, or the like. Conventionally, a terminal associated with a first cell can institute procedures for switching to a second cell upon finding that the second cell and/or a frequency at which the second cell operates is more favorable than the first cell and/or its associated frequency. However, in a dense network deployment associated with a large number of cells, a terminal can in some cases attempt cell reselection excessively, which can in turn cause battery loss, performance degradation, or the like. Accordingly, it would additionally be desirable to implement techniques for managing cell reselection in a wireless communication system that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a ranking criterion associated with selection of a cell in a wireless communication system; determining whether the cell is known to belong to an associated Closed Subscriber Group (CSG) whitelist; and selecting at least one of an offset or a hysteresis parameter to be applied to the ranking criterion based at least in part on a result of the determining.

A second aspect described herein relates to a wireless communications apparatus, which can comprise a memory that stores data relating to a network cell, a ranking metric associated with selection of the network cell, and a list of allowed CSG cells. The wireless communications apparatus can further comprise a processor configured to select at least one of an offset or a hysteresis parameter to be applied to the ranking metric associated with selection of the network cell based at least in part on a result of a determination of whether the network cell is known to belong to the list of allowed CSG cells.

A third aspect relates to an apparatus, which can comprise means for identifying a ranking parameter associated with selection of a network cell; and means for selecting an offset or hysteresis parameter to apply to the ranking parameter for a given network cell based at least in part on a determination of CSG whitelist membership of the given network cell.

A fourth aspect described herein relates to a computer program product, which can include a computer-readable medium that comprises code for causing a computer to identify a ranking criterion associated with selection of a cell in a wireless communication system; and code for causing a computer to select an offset or hysteresis parameter to apply to the ranking criterion associated with selection of the cell based at least in part on a determination of CSG whitelist membership of the cell.

A fifth aspect herein relates to a method operable in a wireless communication environment. The method can comprise initializing a first reselection timer and a second reselection timer, wherein the first reselection timer is configured to expire prior to the second reselection timer; identifying a cell for which a reselection procedure is to be conducted; determining whether the cell is a Home Node B (HNB) cell or a Home Evolved Node B (HeNB) cell; and configuring reselection to the cell to occur upon expiration of the first reselection timer or upon expiration of the second reselection timer based at least in part on a result of the determining.

A sixth aspect relates to a wireless communications apparatus, which can comprise a memory that stores data relating to a network cell for which reselection is to be conducted. The wireless communications apparatus can further comprise a processor configured to configure a first reselection delay and a second reselection delay such that the first reselection delay is shorter than the second reselection delay, to determine whether the network cell for which reselection is to be conducted is a HNB or a HeNB, and to configure reselection to the network cell to occur at the first reselection delay or the second reselection delay based at least in part on whether the network cell is a HNB or a HeNB.

A seventh aspect described herein relates to an apparatus operable in a wireless communication system. The apparatus can comprise means for initializing a first cell selection timer and a second cell selection timer such that the first cell selection timer is configured to expire before the second cell selection timer; means for identifying a network cell for which reselection is to be conducted; and means for conducting reselection to the network cell upon expiration of the first cell selection timer or the second cell selection timer based at least in part on whether the network cell is a HNB or HeNB cell.

An eighth aspect relates to a computer program product, which can include a computer-readable medium that comprises code for causing a computer to initialize a first cell selection timer and a second cell selection timer such that the first cell selection timer is configured to expire before the second cell selection timer; code for causing a computer to identify a cell in a wireless communication system for which reselection is to be conducted; and code for causing a computer to conduct reselection to the cell upon expiration of the first cell selection timer or the second cell selection timer based at least in part on whether the cell is a HNB cell or a HeNB cell.

A ninth aspect relates to a method, which can comprise the acts of identifying a candidate frequency for cell reselection within a wireless communication system; identifying a CSG cell on the candidate frequency that is deemed desirable based on at least one of provided services or CSG whitelist membership; and camping on the identified CSG cell on the candidate frequency upon determining that the identified CSG cell is a highest ranked cell on the candidate frequency.

A tenth aspect described herein relates to a wireless communications apparatus, which can comprise a memory that stores data relating to a candidate frequency for reselection and a CSG whitelist. The wireless communications apparatus can further comprise a processor configured to identify a CSG cell on the candidate frequency that is deemed desirable based on at least one of services provided by the CSG cell or membership of the CSG cell in the CSG whitelist, to identify a highest ranked cell on the candidate frequency, and to initiate camping on the CSG cell on the candidate frequency upon determining that the CSG cell is the highest ranked cell on the candidate frequency.

An eleventh aspect relates to an apparatus, which can comprise means for identifying a candidate frequency for cell reselection; means for identifying a desirable CSG cell on the candidate frequency; and means for camping on the desirable CSG cell on the candidate frequency upon determining that the desirable CSG cell is a highest ranked cell on the candidate frequency.

A twelfth aspect described herein relates to a computer program product, which can include a computer-readable medium that comprises code for causing a computer to identify a frequency associated with a cell reselection operation; code for causing a computer to identify a desirable CSG cell on the identified frequency; and code for causing a computer to camp on the desirable CSG cell on the identified frequency upon determining that the desirable CSG cell is a highest ranked cell on the identified frequency.

A thirteenth aspect relates to a method, which can comprise providing a first set of parameters to a first set of one or more users, wherein the first set of parameters modify ranking formulas utilized by the first set of one or more users for cell reselection based on CSG membership; and providing a second set of parameters to a second set of one or more users, wherein the second set of parameters modify a reselection delay employed by the second set of one or more users with respect to selection of respective HNB cells or HeNB cells.

A fourteenth aspect described herein relates to a wireless communications apparatus, which can comprise a memory that stores data relating to a first set of parameters that modify ranking criteria for cell reselection based on CSG membership and a second set of parameters that modify a reselection delay employed with respect to selection of respective HNB cells or HeNB cells. The wireless communications apparatus can further comprise a processor configured to convey the first set of parameters to a first set of one or more users and to convey the second set of parameters to a second set of one or more users.

A fifteenth aspect described herein relates to an apparatus, which can comprise means for indicating a first set of parameters that offset ranking criteria employed for cell selection based on CSG membership; and means for indicating a second set of parameters that control a reselection delay employed with respect to selection of respective HNB or HeNB cells.

A sixteenth aspect herein relates to a computer program product, which can include a computer-readable medium that comprises code for causing a computer to communicate a first set of parameters that offset ranking criteria employed for cell selection based on CSG membership; and code for causing a computer to communicate a second set of parameters that control timing associated with selection of respective HNB or HeNB cells.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
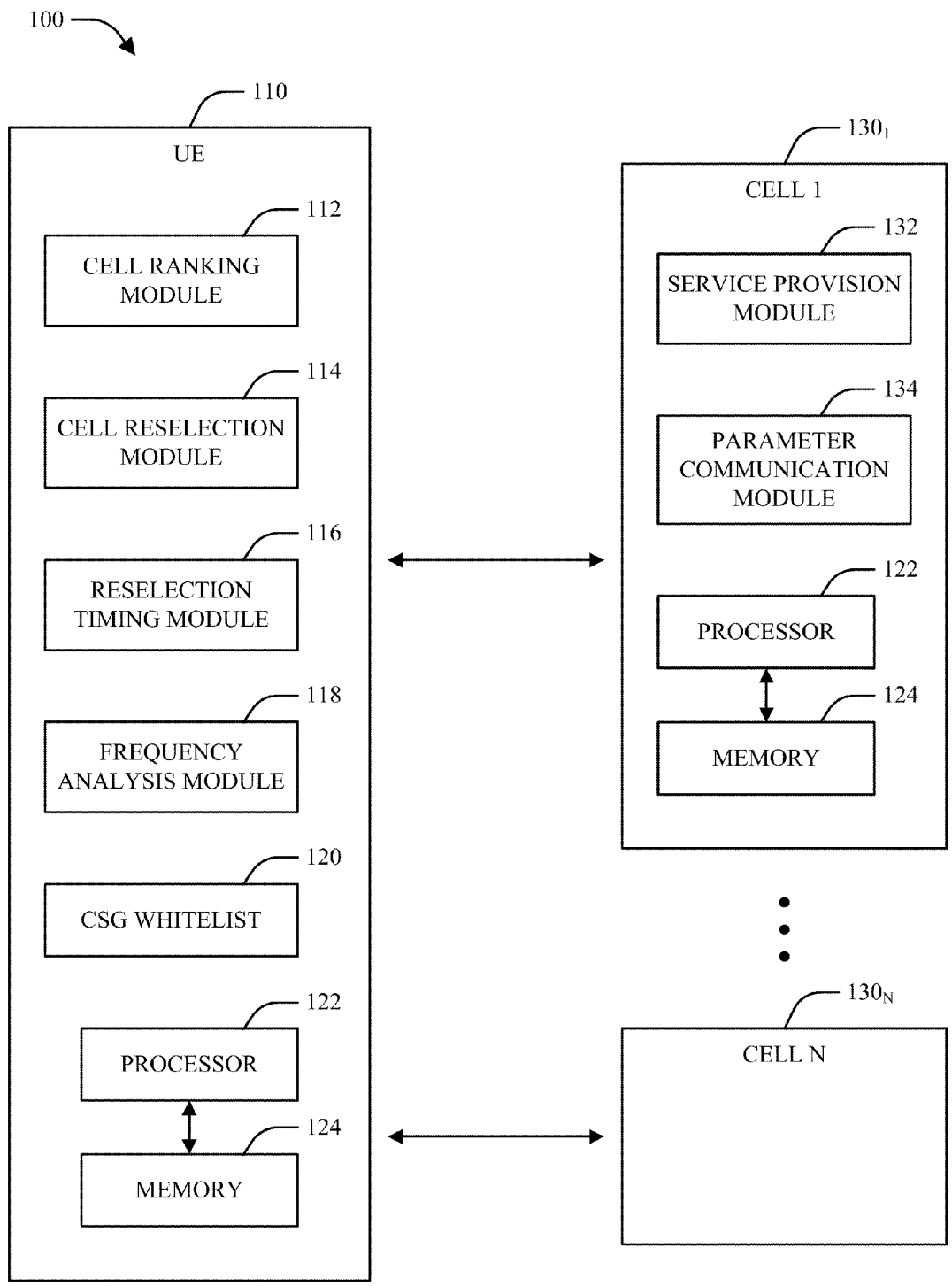
FIG. 1 is a block diagram of a system for managing cell selection in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for managing cell selection in a wireless communication system in accordance with various aspects described herein. As FIG. 1 illustrates, system 100 can include one or more user equipment units (UEs) 110, which can communicate with one or more network cells 130. In one example, respective network cells 130 can be of any suitable type(s), such as macro cells, femto cells (e.g. access point base stations, Home Node B (HNB) cells, Home Evolved Node B (HeNB) cells, etc.), and/or any other suitable type of cell that corresponds to any suitable coverage area. In one example, UE 110 can conduct one or more uplink (UL, also referred to as reverse link (RL)) communications to one or more cells 130, and respective cells 130 can conduct one or more downlink (DL, also referred to as forward link (FL)) communications to UE 110. System 100 can correspond to an Evolved Universal Terrestrial Radio Access Network (E-UTRAN) and/or any other suitable network implementation(s).

In accordance with one aspect, in the event that one or more cells 130 are HNB cells (e.g., HNB cells, HeNB cells, etc.), some UEs 110 can be provisioned with a whitelist of allowed Closed Subscriber Group (CSG) cells. As used herein and generally in the art, a CSG identifies (e.g., based on a CSG identifier (ID)) respective UEs and/or other subscribers that are allowed to use respective restricted-access network cells that correspond to a network (e.g., a public land mobile network (PLMN)) associated with a given network operator. Further, the term "CSG cell" as used herein refers to a cell that indicates its status as a CSG cell and provides a CSG identity. In one example, a CSG cell can be configured for use by a given UE only if the CSG ID of the cell is in a CSG whitelist 120 associated with the UE. Additionally, it should be appreciated that the terms "HNB" or "HNB cell" as generally utilized herein are intended to refer generally to HNBs, HeNBs, and/or any other similar and appropriate cell type and are not intended to be limiting to any single particular cell type unless explicitly stated otherwise.

In one example, in the event that a UE 110 has a given CSG ID corresponding to a cell 130 in its CSG whitelist 120, various special billing and/or other service benefits can be provided by a service provision module 132 associated with the cell 130 and/or otherwise made available by the cell 130. In a further example, a UE 110 can be configured to display an icon and/or other indication that it is under the coverage of a CSG cell and/or that special benefits of a CSG cell are available.

In accordance with one aspect, UE 110 can actively engage in control and/or data communication with one or more cells 130 and/or operate in an idle mode, wherein UE 110 monitors paging and overhead channels associated with respective cells 130 but does not have dedicated data or control channels allocated. In one example, UE 110 can associate with or "camp" on a given cell 130 (herein referred to as a "camped cell") while operating in idle mode, wherein UE 110 monitors system information, paging information, and/or other suitable information from the camped cell. In another example, UE 110 can select a cell 130 on which to camp based on a preconfigured set of cell selection or reselection rules. Additionally or alternatively, if a given cell 130 is a CSG cell, a UE 110 can be configured to camp on the cell only upon determining that a CSG ID associated with the cell matches one or more CSG IDs provided in a CSG whitelist 120 associated with the UE 110.

To the furtherance of at least the above ends, UE 110 can include a cell ranking module 112 that can be utilized to ascertain and rank the desirability of respective cells 130 for camping and a cell reselection module 114 to facilitate reselection to a given cell 130 indicated by cell ranking module 112. In one example, cell ranking module 112 can rank respective cells by computing a ranking criterion (or "R value") corresponding to respective cells 130, based on which cell reselection module 114 can facilitate select of the cell 130 with the highest R value for camping.

In accordance with various aspects described herein, cell ranking module 112, cell reselection module 114, and/or any other suitable component(s) of UE 110 can be configured such that the amount of time UE 110 is allowed to camp on a HNB cell is increased. This can be accomplished, for example, by providing respective bias and/or hysteresis values that can be configured by the network to modify the ranking criterion computed for a CSG cell in system 100. In one example, respective ranking criterion offsets can be configured both for the case of a CSG cell that is in the CSG whitelist 120 of UE 110 and the case of a CSG cell that is not in the CSG whitelist 120.

In accordance with further aspects described herein, a reselection timing module 116 and/or other suitable mechanisms can be provided at UE 110 in order to facilitate the use of a HNB-specific timer in connection with a cell selection procedure within system 100. For example, by providing a HNB-specific reselection timer, reselection timing module 116 can enable UE 110 to better manage battery life by enabling UE 110 to conserve power conventionally associated with reading excessive system information messages from respective HNBs. It can be appreciated that the power conservation realized by employing reselection timing module 116 in this manner can be significant in scenarios where, for example, UE 110 visits multiple HNB cells in a relatively short period of time.

In accordance with additional aspects described herein, UE 110 can further be provided with a frequency analysis module 118, which can be utilized by UE 110 to perform improved frequency analysis in the context of cell reselection in order to avoid undesirable cell changes and realize corresponding throughput and power efficiency gains. Respective techniques by which cell ranking module 112, cell reselection module 114, reselection timing module 116, and frequency analysis module 118 can be utilized are described in further detail herein. Additionally, UE 110 can utilize a processor 122 and/or memory 124 to implement some and/or all of the functionality described herein.

In accordance with another aspect, UE 110 can perform one or more techniques as described herein based on respective parameters provided by a parameter communication module 134 and/or other suitable components of one or more cells 130. Such parameters can include, for example, respective parameters that modify ranking formulas or criteria utilized by respective UEs 110 for cell reselection based on CSG membership, respective parameters that modify a reselection delay employed by respective UEs 110 with respect to selection of HNB cells, or the like. In one example, respective cells in system 100 can utilize a processor 122 and/or memory 124 to implement some or all network functionality described herein in a similar manner to processor 122 and/or memory 124 at UE 110. In addition, it should be appreciated that while modules 132-134, processor 122, and memory 124 are illustrated at only one cell 130 in FIG. 1 for brevity, such components could be utilized by any suitable cell or other entity in system 100.

Figure 2:
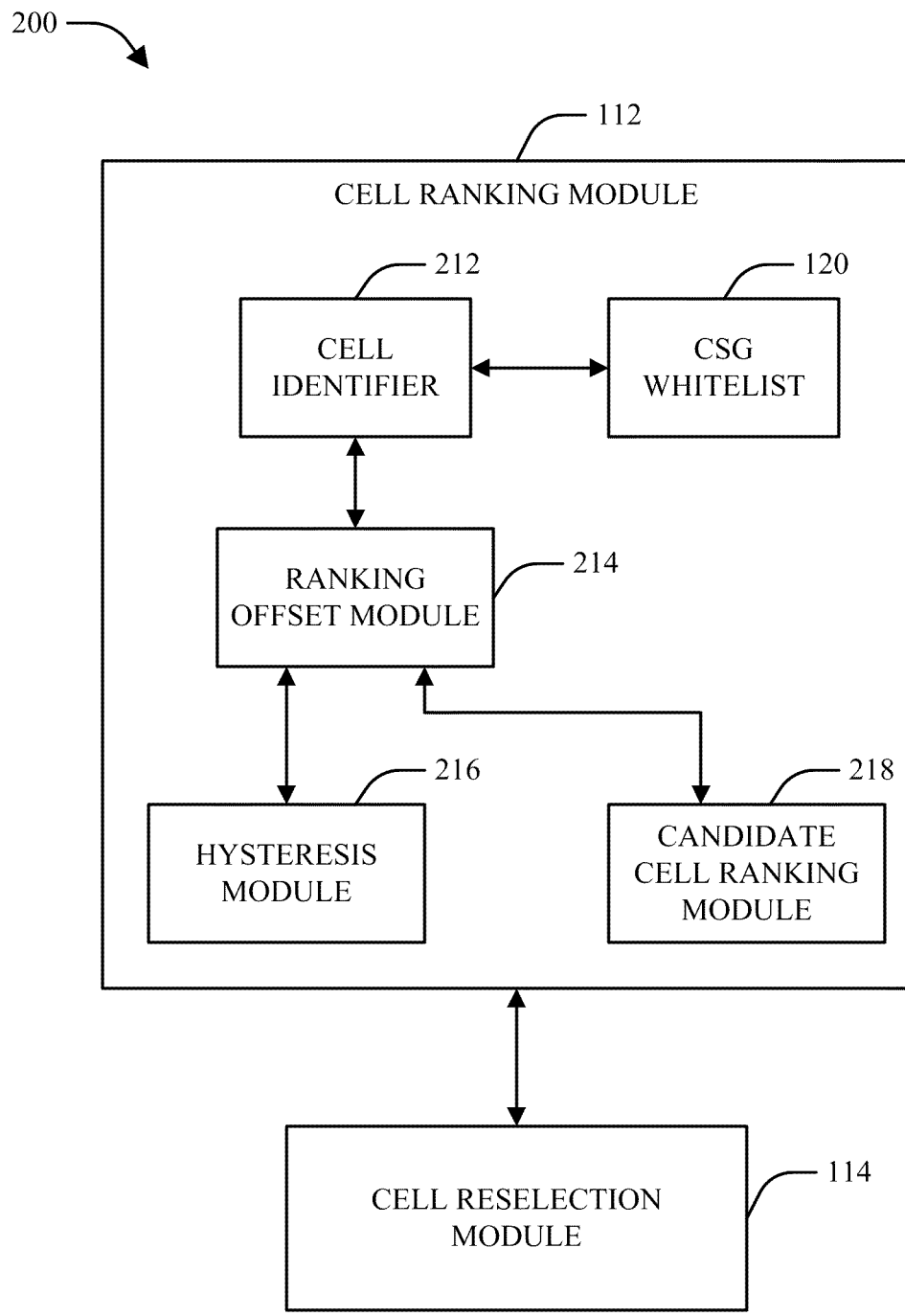
FIG. 2 is a block diagram of a system for ranking network cells in connection with a cell selection operation in accordance with various aspects.

Turning now to FIG. 2, illustrated is a block diagram of a system 200 for ranking network cells in connection with a cell selection operation in accordance with various aspects. As FIG. 2 illustrates, system 200 can include a cell ranking module 112, which can work in cooperation with a cell reselection module 114 in order to facilitate selection and reselection of network cells for camping by an associated device (e.g., UE 110).

In one example, a device associated with system 200 can be camped on a given Node B and moving such that it is approaching the coverage of its preferred CSG HNB (e.g., as given by CSG whitelist 120). Conventionally, it can be appreciated that the point where cell reselection module 114 reselects to another HNB can be given as a function of ranks computed by cell ranking module. Thus, cell reselection module 114 can facilitate reselection of network cells when a rank metric applied to a candidate cell n (e.g. $R_n$) is greater than a rank metric applied to a current camped cell (e.g., $R_s$). This can be expressed as follows:

$$Q_{meas,n} - Q_{offset,n}(HNB) > Q_{meas,NB} + Q_{hyst}(NB), \text{ or}$$

$$Q_{meas,n} > Q_{meas,NB} + Q_{hyst(NB)} + Q_{offset,n}(HNB),$$

where $Q_{meas,n}$ is the measured signal strength from the candidate cell, $Q_{meas,n}$ is the measured signal strength from a current camped Node B (NB), $Q_{hyst}$ is a hysteresis value (in dB) that increases the R value of the current camped Node B and is designed to discourage frequent and unnecessary cell reselection, and $Q_{offset,n}$ is an offset value applied to the candidate cell to modify the R value of the candidate cell. In one example, $Q_{offset,n}$ and $Q_{hyst}$ can be configured as per-cell offsets for which a network associated with system 200 can set for respective cells based on their corresponding cell IDs. Cell IDs can correspond to, for example, physical cell ID (PCI) parameters, primary synchronization code (PSC) parameters, CSG ID parameters, or the like.

With regard to the above conventional cell reselection procedure, it can be appreciated that said procedure does not differentiate between a CSG cell and other types of candidate cells, it can be appreciated that using such a procedure can result in delayed selection of a preferred HNB (e.g., due to hysteresis of the current camped cell) while the device associated with system 200 is moving from the area associated with the camped cell to the coverage area of the preferred HNB. As a result, it can be appreciated that the overall amount of opportunity provided to a user in obtaining the benefits of the preferred HNB are reduced. Further, it can be appreciated that the above shortcomings cannot be mitigated simply by adjusting the value of $Q_{offset,n}(HNB)$, as such parameter is common for all UEs in the network and not specific to a given UE that prefers service from and/or can otherwise access a specific HNB.

In accordance with one aspect, system 200 can overcome at least the above shortcomings and enable expedited selection of preferred network cells by enabling cell ranking module to offset rankings associated with respective network cells based on CSG membership of the respective network cells. In one example, a cell ranking module 112 can utilize a cell identifier 212 in connection with a potential reselection to a candidate network cell. Cell identifier 212 can, for example, compare identification information associated with the candidate network cell to an associated CSG whitelist 120 and/or other information in order to determine whether the candidate cell is known to belong to CSG whitelist 120. Based on this determination, a ranking offset module 214 can be utilized to provide CSG-specific offset and/or hysteresis information to a hysteresis module 216 and/or a candidate cell ranking module 218. Based on cell rankings provided by hysteresis module 216 and/or candidate cell ranking module 218, cell reselection module 114 can subsequently be utilized to facilitate transferral to a new camped cell under the appropriate circumstances.

Figure 3:
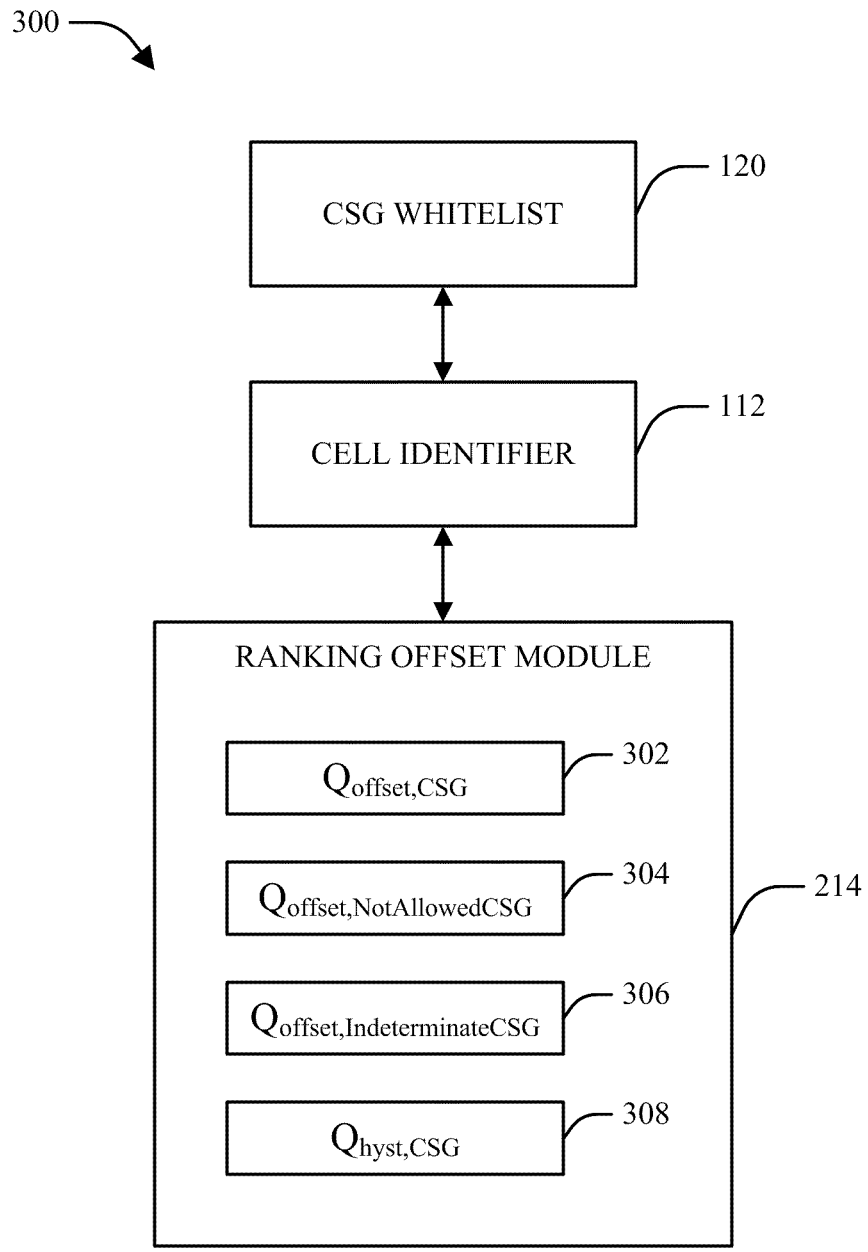
FIG. 3 is a block diagram of a system for identifying a ranking offset to be applied to respective network cells in accordance with various aspects.

In accordance with another aspect, ranking offset module 214 can apply one or more ranking offsets and/or hystesis parameters selected from a set of possible parameters based on the nature of the associated cell selection procedure. This is illustrated in further detail by system 300 in FIG. 3. As FIG. 3 illustrates, based on respective determinations by cell identifier 112 in relation to CSG whitelist 120, ranking offset module 214 can apply one or more of a CSG-specific offset 302 for allowed cells, a CSG-specific non-allowed cell offset 304, a CSG-specific indeterminate cell offset 306, and/or a CSG-specific hysteresis parameter 308. Example techniques by which parameters 302-308 can be derived and/or applied are set forth in further detail in the following description.

Returning to FIG. 2, candidate cell ranking module 218 can compute a ranking criterion for a candidate cell for reselection based on membership of the candidate cell in CSG whitelist 120 as follows. For example, for a cell n that is a CSG cell in CSG whitelist 120 and is not the current serving cell of the device associated with system 200, the ranking criterion of cell n can be modified as follows:

$$R_n = Q_{meas,n} - Q_{offset,CSG},$$

where $Q_{offset,CSG}$ (e.g., offset parameter 302) is a parameter known to system 200 that is utilized for reducing the outgoing hysteresis from a camped Node B to a CSG HNB in CSG whitelist 120 from $Q_{hyst}$ to ($Q_{hyst}+Q_{offset,CSG}$). In accordance with one aspect, the offset $Q_{offset,CSG}$ can be communicated to system 200 and/or a device associated with system 200 in various manners. For example, the offset can be advertised by a serving cell for system 200 as a system information block (SIB). As another example, the offset can be communicated to system 200 at the time of a closed connection through one or more appropriate information elements (IEs) such as, for example, IdleModeMobilityControlInfo IE. In one example, $Q_{offset,CSG}$ can be a value in the range between −3 to 0 dB in steps of 1 dB and/or any other suitable value.

Figure 4:
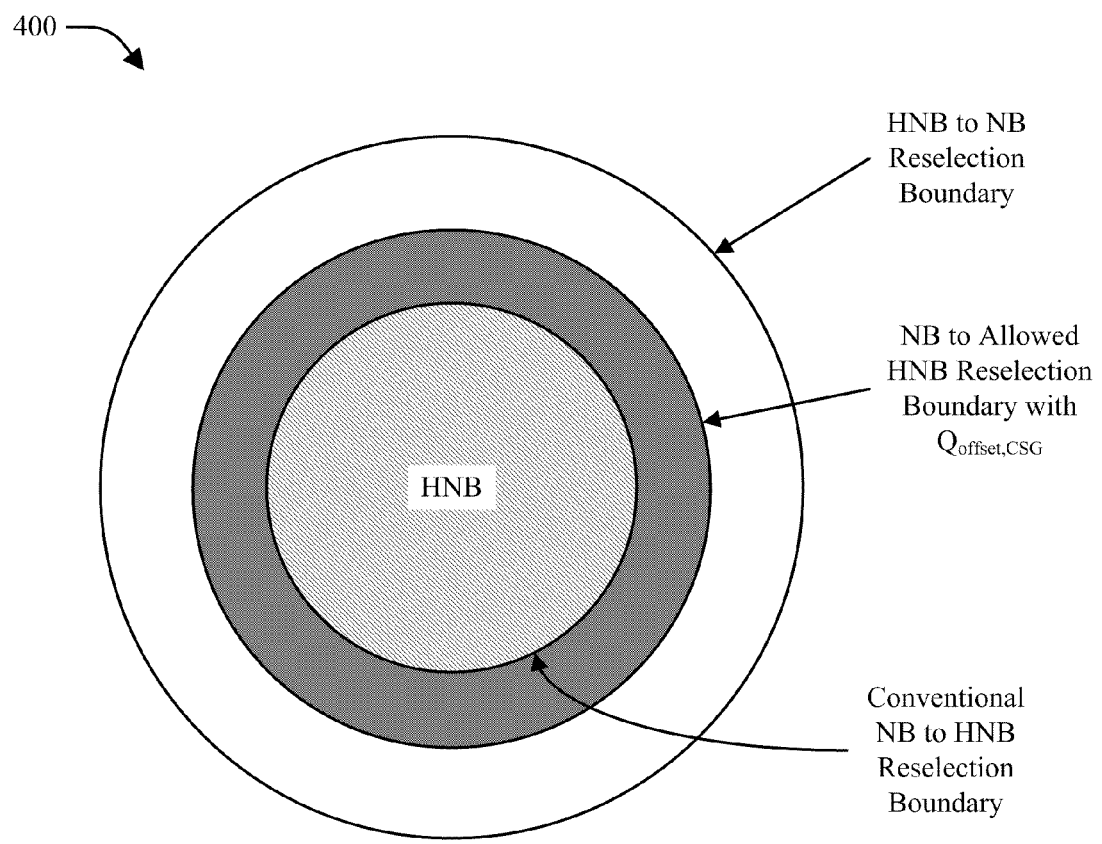
FIGS. 4-6 illustrate respective examples of cell reselection based on ranking offsets as identified and selected in accordance with various aspects described herein.

In accordance with one aspect, utilizing $Q_{offset,CSG}$ in the above manner can enable an associated UE to prefer the selection of a CSG HNB in CSG whitelist 120 at an earlier time than that associated with conventional cell selection techniques, thereby increasing the area in which the UE camps at the HNB. This is illustrated by diagram 400 in FIG. 4, wherein the reselection boundary for NB to HNB reselection is shifted outwards due to $Q_{offset,CSG}$. It can be appreciated that the extent to which the reselection boundary for NB to HNB selection is shifted can be controlled by the magnitude of $Q_{offset,CSG}$.

In one example, $Q_{offset,CSG}$ can be configured to be applied for a given cell only by those UEs having the cell in their associated CSG whitelist 120, such that all other UEs are configured to utilize alternative ranking techniques with respect to the cell. Additionally or alternatively, it can be appreciated that $Q_{offset,CSG}$ can be a system-wide parameter communicated to all UEs associated with the system and/or custom-tailored parameters that are computed for and signaled to respective UEs or groups of UEs on an individual basis.

In accordance with another aspect, it can be appreciated that while a device associated with system 200 can prefer to receive service from an allowed CSG cell (e.g., a CSG cell provided within CSG whitelist 120), the device may in some cases be unable to receive service from CSG cells that are outside CSG whitelist 120. Accordingly, candidate cell ranking module 218 can additionally or alternatively be utilized to lower the ranking of non-allowed cells by utilizing a separate offset for non-allowed cells. More particularly, for a cell n that is a CSG cell not known to be in CSG whitelist 120 and not the current serving cell of the device associated with system 200, the ranking criterion of cell n can be modified as follows:

$$R_n = Q_{meas,n} - Q_{offset,NotAllowedCSG},$$

where $Q_{offset,NotAllowedCSG}$ (e.g. offset parameter 304) is a parameter known to system 200 that is utilized for increasing the outgoing hysteresis from a camped Node B to a CSG HNB not known to be in CSG whitelist 120. In accordance with one aspect, the offset $Q_{offset,NotAllowedCSG}$ can be communicated to system 200 and/or a device associated with system 200 in one or more similar manners to that described above with respect to $Q_{offset,CSG}$. In one example, $Q_{offset,NotAllowedCSG}$ can be a value in the range between 0 to 3 dB in steps of 1 dB and/or any other suitable value.

Figure 5:
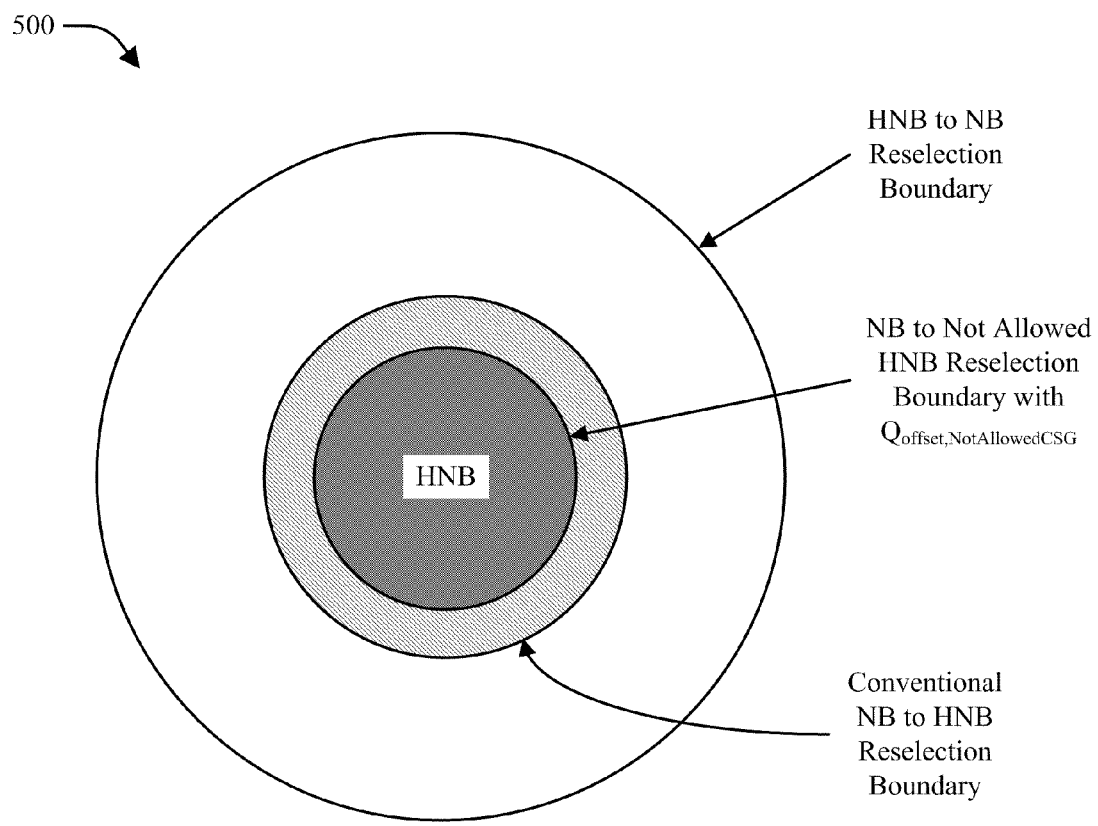

In one example, $Q_{offset,NotAllowedCSG}$ can enable an associated UE to decrease the radius at which selection of a CSG HNB not in CSG whitelist 120 is attempted as compared to conventional cell selection techniques. This is illustrated by diagram 500 in FIG. 5, wherein the reselection boundary for NB to HNB reselection is shifted inwards due to $Q_{offset,NotAllowedCSG}$. In one example, the extent to which the reselection boundary for NB to HNB selection is shifted can be controlled by the magnitude of $Q_{offset,NotAllowedCSG}$.

With respect to the above examples, it can be appreciated that an offset $Q_{offset,NotAllowedCSG}$ can be utilized for modifying ranking criteria associated with cells not known to be in CSG whitelist 120. Alternatively, it can further be appreciated that other forms of offset parameters could be utilized. For example, a first offset $Q_{offset,NotAllowedCSG}$ can be utilized for CSG cells known not to be in CSG whitelist 120, while a second offset $Q_{offset,IndeterminateCSG}$ (e.g., offset parameter 306) can be utilized for cells for which the corresponding CSG membership status is unknown (e.g., as a result of refraining from reading a CSG ID associated with the cell and/or for other reasons).

In accordance with a further aspect, system 200 can additionally or alternatively be utilized to facilitate CSG-specific hysteresis, wherein the radius at which a UE and/or other device associated with system 200 switches from a currently camped cell to another network cell is modified based on CSG membership of the currently camped cell. For example, CSG-specific hysteresis can be utilized to expand the area within which HNB services are available to a UE that prefers a particular HNB, in the context of reselection from said HNB to another Node B.

Conventionally, for a UE camped on a HNB in an associated CSG whitelist and moving closer to the coverage area of another Node B (n), the point at which the UE will reselect to Node B n from the camped HNB at a point in which a rank metric applied to Node B n (e.g., $R_n$) is greater than a rank metric applied to the camped HNB (e.g., $R_s$). This can be expressed as follows:

$$Q_{meas,n} - Q_{offset,n}(NB) > Q_{meas,HNB} + Q_{hyst}(HNB).$$

It can be appreciated that, as the above parameters are not specific to particular UEs, a first UE that prefers the HNB and a second UE that does not prefer the HNB will both perform reselection at the same time based on the above comparison. However, as the first UE prefers the currently camped HNB and the second does not, it can be appreciated that it is desirable to enable the respective UEs to utilize different rules for reselection. In particular, it would be desirable to implement a rule at the first UE wherein reselection is not performed until the strength of Node B n is much stronger than that of the HNB and a rule at the second UE wherein reselection is performed at a smaller observed strength difference between Node B n and the HNB. Further, it can be appreciated that the above ends cannot be achieved by simply adjusting $Q_{offset,n}$ (NB), as said parameter is common for all UEs and not specific to a UE that prefers service from a specific HNB.

Figure 6:
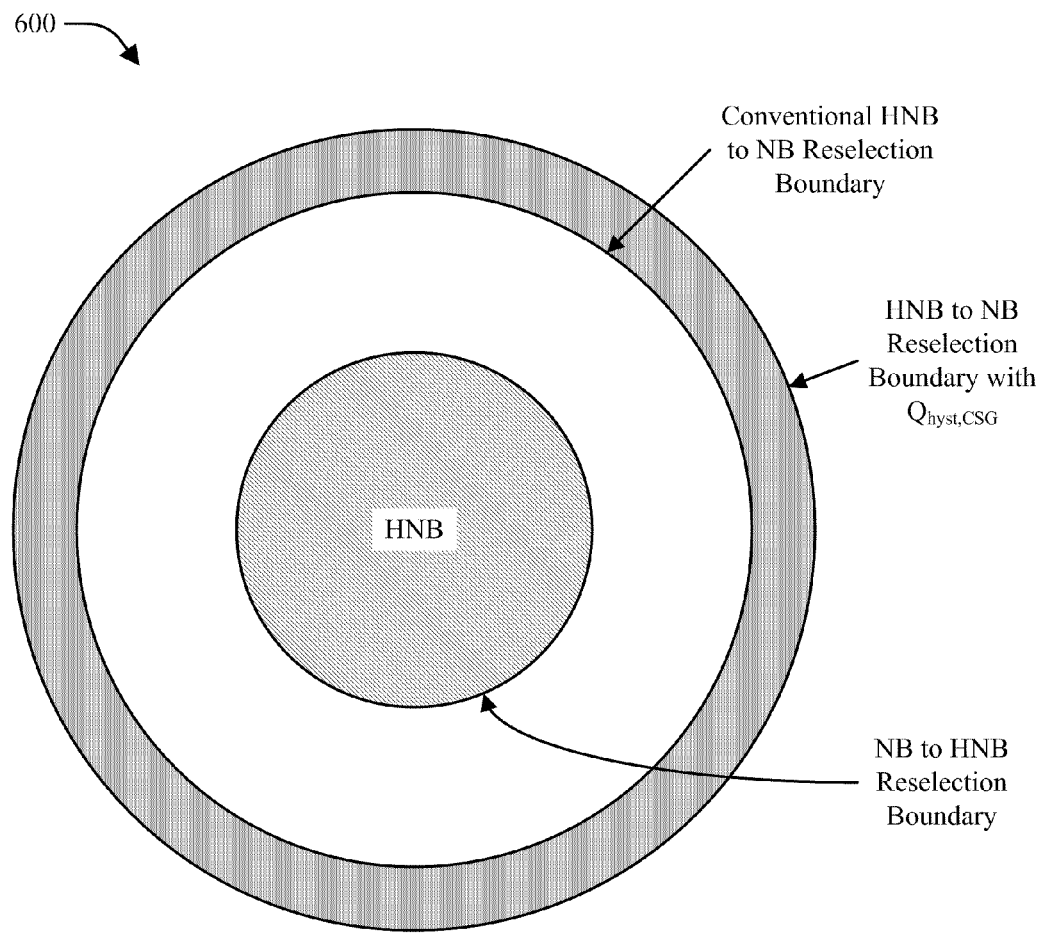

To the furtherance of at least the above ends, hysteresis module 216 and/or other suitable mechanisms associated with cell ranking module 112 can utilize a UE-specific hysteresis value $Q_{hyst}$(HNB) (e.g., parameter 308), which can be utilized by hysteresis module 216 to increase the radius at which a device associated with hysteresis module 216 can remain associated with a preferred HNB. In one example, a HNB cell can advertise respective hysteresis parameters in one or more manners that are similar to those described above with respect to $Q_{offset,CSG}$ and $Q_{offset,NotAllowedCSG}$. These hysteresis parameters can include, for example, a parameter $Q_{hyst}$ that can be utilized by a UE that does not have the HNB cell in its whitelist, a parameter $Q_{hyst,CSG}$ that can be utilized by a UE that does have the HNB in its whitelist, and/or any other suitable parameters. In another example, hysteresis parameters advertised by a given HNB can be configured such that $Q_{hyst} < Q_{hyst,CSG}$, thereby allowing the HNB to increase its effective coverage area for respective UEs of interest. This is shown in further detail by diagram 600 in FIG. 6.

In view of the above description and FIGS. 2-6, it can be observed that by setting respective CSG-specific parameters such as $Q_{hyst,CSG}$ and $Q_{offset,CSG}$, a UE can be enabled to obtain service from its preferred CSG cell in a larger fraction of coverage area. In one example, the overall hysteresis between reselections (e.g., the difference in distance between a NB-to-HNB reselection boundary and a HNB-to-NB reselection boundary) can be held substantially constant such that the amount of signal strength fluctuation that can cause a "ping-pong" reselection (e.g., reselection from a cell A to a cell B followed by a reselection back to cell A) can be substantially similar for respective UEs irrespective of CSG membership. This can be done by, for example, implicitly setting the value of $Q_{hyst,CSG}$ as follows:

$$Q_{hyst,CSG} = Q_{hyst} + Q_{offset,n}(HeNB) - Q_{offset,CSG}.$$

In such an example, it can be appreciated that $Q_{hyst,CSG}$ may in some cases not be signaled to respective UEs in the event that the respective UEs have sufficient information for independently computing $Q_{hyst,CSG}$.

Figure 7:
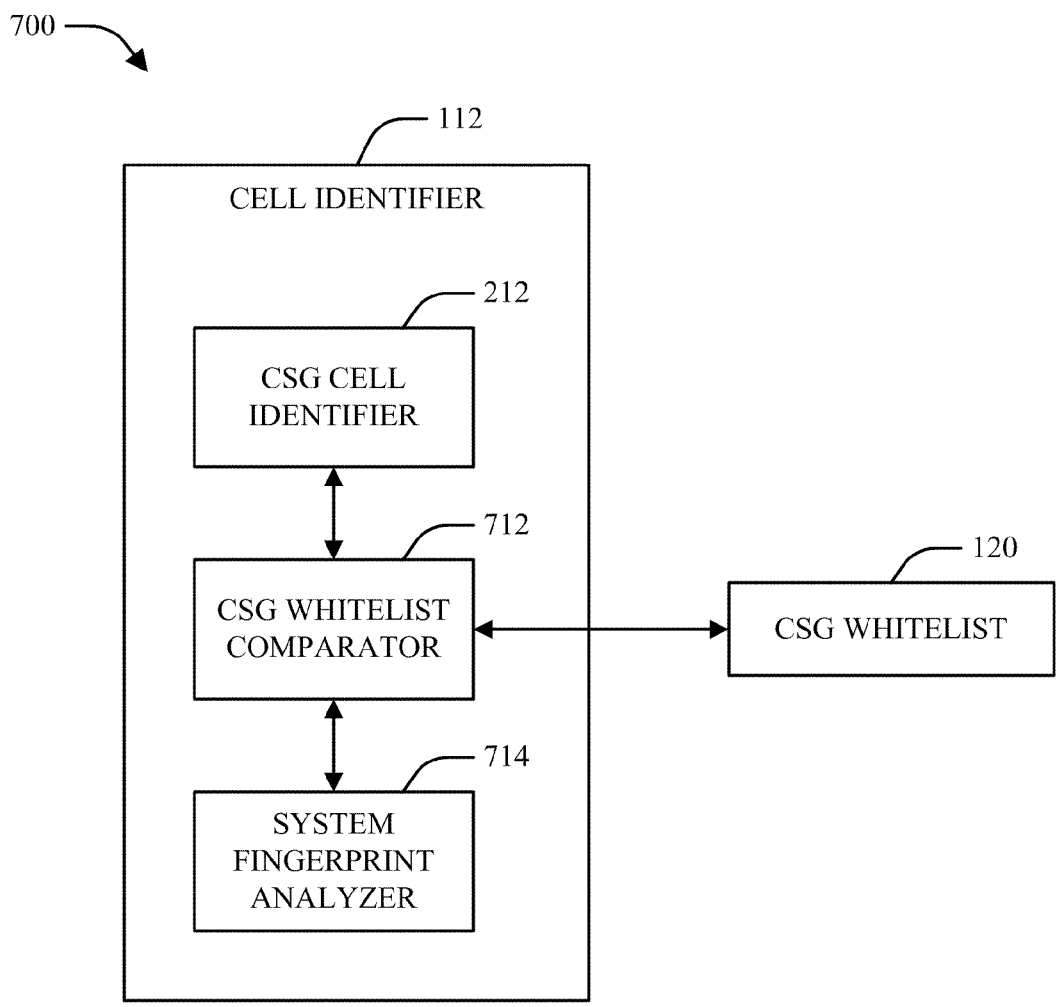
FIG. 7 is a block diagram of a system for determining CSG membership status of a given network cell in accordance with various aspects.

Turning next to FIG. 7, a block diagram of a system 700 for determining CSG membership status of a given network cell in accordance with various aspects is illustrated. In one example, CSG membership as determined by system 700 can be utilized for rendering decisions on application of respective CSG-specific parameters as described above and/or for any other suitable use(s).

In accordance with various aspects as provided above, respective CSG-specific offset parameters (e.g. $Q_{offset,CSG}$, $Q_{offset,NotAllowedCSG}$, etc.) can be configured to be applicable only for CSG cells. Accordingly, in order to determine if a particular cell n can benefit from such offsets, CSG cell identifier 212 can be utilized to read the CSG identity of that cell, based on which a CSG whitelist comparator 712 can determine if the cell is in an associated CSG whitelist 720. In one example, cell identifier 112 can in some cases be configured to read the CSG ID of all cells it encounters (e.g., femto cells, macro cells, etc.). Alternatively, cell identifier 112 can be configured to read only a subset of CSG IDs in various manners as described herein in order to conserve battery life. For example, a network cell and/or another suitable network entity can signal to cell identifier 112 that a certain set of cell identifiers (e.g., PCI values, PSCs, etc.) is reserved for CSG cells such that cell identifier 112 can avoid reading CSG IDs corresponding to macro cells and other non-CSG cells. In an alternate example, cell identifier 112 can have a priori knowledge of a cell identifier corresponding to a CSG cell in CSG whitelist 120 such that CSG cell identifier 212 can be configured to read the CSG ID of only the known cell.

In a further example, cell identifier 112 can utilize a system fingerprint analyzer 714 to obtain a fingerprint associated with a current network location. The fingerprint can include for example, a pattern of signals received from various Node Bs that indicates that cell identifier 112 is in a particular location. System fingerprint analyzer 714 can utilize physical or global cell identifier(s), tracking area(s) (e.g., obtained via a global positioning system (GPS) mechanism or the like), signal strength(s), and/or other suitable metrics to form a fingerprint. Subsequently, based on such a fingerprint, cell identifier 112 can determine that it is potentially near a CSG cell in CSG whitelist 120. Based on this determination, CSG cell identifier 212 can read the CSG ID of respective cells being examined for reselection. In one example, for cells for which a CSG ID is not read, CSG whitelist comparator 712 can assume that the cell does not belong to CSG whitelist 120.

In view of respective aspects provided above, an example operating procedure that can be utilized by cell identifier 112 is described as follows. It should be appreciated, however, that the following description is provided merely as one example of a procedure that could be utilized and that the hereto appended claims are not intended to be limited to such an example unless explicitly recited otherwise. In one example, upon beginning idle mode cell reselection, a candidate cell n can be identified for which a ranking is to be evaluated. Subsequently, a determination can be made as to whether candidate cell n is a CSG or HNB cell and whether CSG-specific offsets are known to cell identifier 112. If candidate cell n is found not to be a CSG or HNB cell and/or CSG-specific offsets are not known to cell identifier 112, a rank metric can be computed for candidate cell n based on system-wide ranking offset and hysteresis parameters. Otherwise, upon determining that CSG-specific offset parameters are available and that candidate cell n is a CSG or HNB cell, CSG whitelist comparator 712 can be utilized to determine whether candidate cell n belongs to CSG whitelist 120. Based on this determination, a rank metric can be computed for candidate cell n by utilizing the appropriate CSG-specific offset parameter(s) and/or hysteresis parameter(s). In one example, a CSG offset for allowed cells (e.g., $Q_{offset,CSG}$) can be applied for cells known to belong to CSG whitelist 120 (e.g., cells for which a SIB has been read and found to belong to CSG whitelist 120) and a CSG offset for non-allowed cells (e.g., $Q_{offset,NotAllowedCSG}$) can be applied to all other cells. Alternatively, a CSG offset for disallowed cells can be applied to cells known not to belong to CSG whitelist 120 and a third CSG offset parameter (e.g. $Q_{offset,IndeterminateCSG}$) can be applied to cells for which a CSG ID is not read and/or for which membership in CSG whitelist 120 is otherwise unknown.

While the above description pertains to computing a ranking criterion utilizing CSG-specific offset parameters in connection with switching to a CSG or HNB cell, it can be appreciated that similar techniques could be utilized as described herein for utilizing CSG-specific hysteresis parameters (e.g., $Q_{hyst,CSG}$) in connection with switching from a CSG or HNB cell to another network cell. For example, evaluation could proceed as generally described above for a serving cell in place of a candidate cell n.

Figure 8:
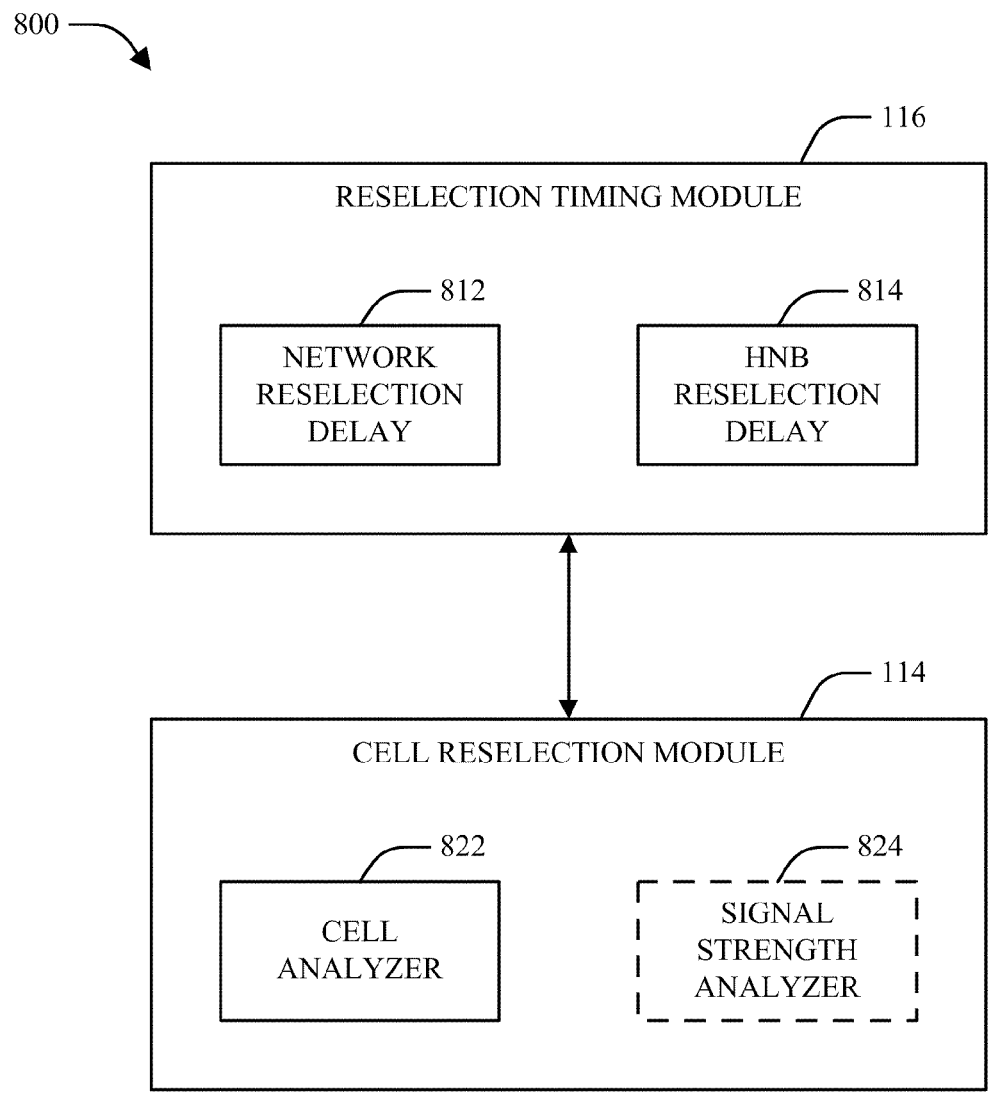
FIG. 8 is a block diagram of a system that facilitates power-efficient cell reselection in a wireless communication system in accordance with various aspects.

Turning next to FIG. 8, a block diagram of a system that facilitates power-efficient cell reselection in a wireless communication system in accordance with various aspects is illustrated. As FIG. 8 illustrates, system 800 can include a cell reselection module 114 that can leverage a reselection timing module 116 to control the frequency with which reselection module 114 attempts cell reselection. For example, HNB cells can in some cases be deployed densely and provide services for small coverage areas. Thus, in the event that a UE is moving, even at a relatively slow rate of speed (e.g., a pedestrian or slow vehicular UE), the UE could see several new cells in a short period of time. Accordingly, battery life spent reading the system information from all such cells can become prohibitive in some cases. Conventionally, reselection timing module 116 can utilize a network reselection delay 812, referred to as $T_{reselection}$, for which an associated UE or other device is required to read system information (e.g. via a cell analyzer 822 at cell reselection module 114) prior to being enabled to reselect to a given cell. While such a network reselection delay 812 of, e.g. 1 second, can be sufficient to prevent excessive battery drain in a pure macro network with large cells, it is desirable to implement further optimizations for networks containing small cells.

Accordingly, to facilitate improved conservation of terminal battery life, a HNB reselection delay 814 (e.g., $T_{reselection,HNB}$) that is configured to be longer than network reselection delay 812 can additionally be employed by reselection timing module 116 such that for a new cell that is known to be a HNB cell (or HeNB cell), cell reselection module 114 is required to reselect to the cell only after the HNB reselection delay. Additionally or alternatively, if a new cell is known to be an allowed CSG cell (e.g., present in a CSG whitelist or otherwise allowed), cell reselection module 114 can be configured to select to the cell before completion of HNB reselection delay 814 but not sooner than network reselection delay 812. In one example, cell reselection module 114 can be utilized in combination with one or more other aspects described herein (e.g., CSG-specific cell ranking offset and/or hysteresis techniques, etc.) and/or any other suitable aspects to facilitate prioritization of CSG cells and/or other HNB or HeNB cells deemed favorable to an associated device.

In accordance with one aspect, cell reselection module 114 can further utilize an optional signal strength analyzer 824 in deciding whether to perform reselection after network reselection delay 812 or HNB reselection delay 814. For example, signal strength analyzer 824 can be utilized to facilitate reselection to an observed cell sooner if the current observed signal strength of a camped cell is relatively weak and/or the current observed signal strength of the observed cell is relatively strong. In accordance with another aspect, signal strength analyzer 824 can operate in various manners to facilitate selection of a cell based on signal strength measurements obtained by an associated device. Various examples of techniques that can be utilized by signal strength analyzer 824 are illustrated below. It should be appreciated, however, that the hereto appended claims are not intended to be limited to such techniques unless explicitly stated otherwise.

By way of specific example, signal strength analyzer can evaluate a strength or quality of respective pilots and/or other suitable reference signals associated with respective observed cells and/or a camped cell. This can be achieved by, for example, measuring signal strength associated with a pilot from a given observed cell and computing a relative quality of the pilot as the ratio of the received strength of the pilot from the observed cell to a total received signal strength from all cells. Accordingly, based on such a ratio, signal strength analyzer 824 can aid cell reselection module 114 in a determination regarding whether to reselect to a given observed cell and, if so, whether to utilize network reselection delay 812 or HNB reselection delay 814 in performing the reselection.

By way of an additional specific example, signal strength analyzer 824 can be configured to sample signal strength from pilots and/or other signals received from respective observed cells according to a predetermined sampling scheme. Thus, for example, a series of N samples of pilot quality can be obtained by signal strength analyzer 824, where N is an integer. With regard to sample collection and/or processing as performed by signal strength analyzer 824, it should be appreciated that samples can be obtained in any suitable manner (e.g., according to a predefined or dynamic sampling rate, etc.) and processed in any manner suitable to obtain indicators of signal quality associated with respective observed cells. For example, N samples obtained within a predefined period can be averaged to obtain an average signal quality, which can be utilized to determine whether reselection is to be performed and/or a delay 812 or 814 to be utilized for reselection. Additionally or alternatively, signal strength analyzer 824 can employ filtering and/or other suitable means to determine whether at least M samples among the N collected samples from an observed cell are above a predefined reselection threshold, where M is an integer less than or equal to N, such that reselection to the observed cell (e.g., at or before HNB reselection delay 814) can be made more likely to be performed upon a positive determination.

By way of a further specific example, signal strength analyzer 824 can be configured to identify that a signal quality associated with a pilot from a currently camped cell has fallen or is falling below a predetermined level. Upon making such a determination, signal strength analyzer can facilitate reselection to any network cell having a suitable signal quality, including CSG cells and/or other preferred HNB or HeNB cells, within the time specified by network reselection delay 812 without requiring reselection to be delayed until expiration of HNB reselection delay 814. Alternatively, upon determining that the signal strength of a camped cell has degraded to an extent so as to render the camped cell unsuitable for service, cell reselection module 114 can be configured to reselect to a highest ranked cell irrespective of any configured timers 812-814.

Figure 9:
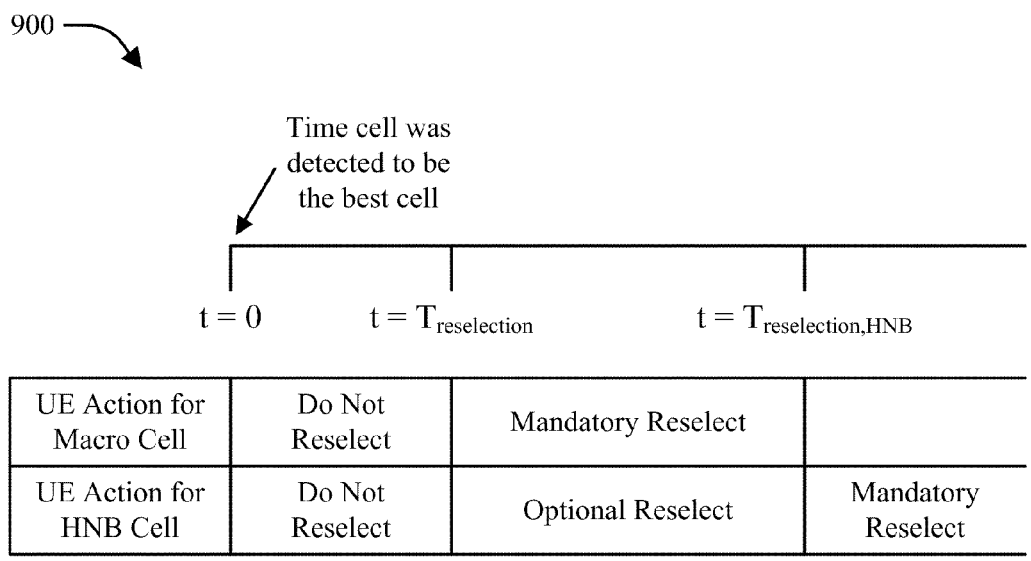
FIG. 9 is a diagram that illustrates example timing configurations for cell reselection in accordance with various aspects.

In accordance with one aspect, example operation of reselection delays 812-814 that can be employed by system 800 is shown in further detail by diagram 900 in FIG. 9. As shown in diagram 900, when a macro cell becomes the strongest or best ranked cell to an associated device, the device can be configured not to reselect to the cell during a period defined by $T_{reselection}$, after which the device can be forced to reselect to the cell. Further, in order to avoid excessive power usage caused by cell reselections, a second timing parameter $T_{reselection,HNB}$ is introduced to increase the amount of time for which a HNB cell is required to be detected as the best cell by a device before mandatory reselection to the cell occurs. Additionally, the time period between expiration of $T_{reselection}$ and $T_{reselection,HNB}$ can be configured as an optional reselection period for HNB cells, such that respective cells that are deemed desirable (e.g., due to being a home or preferred cell for an associated device, services offered by the cell, strength of the cell and/or strength of a current camped cell, etc.) can be selected prior to expiration of $T_{reselection,HNB}$.

Figure 10:
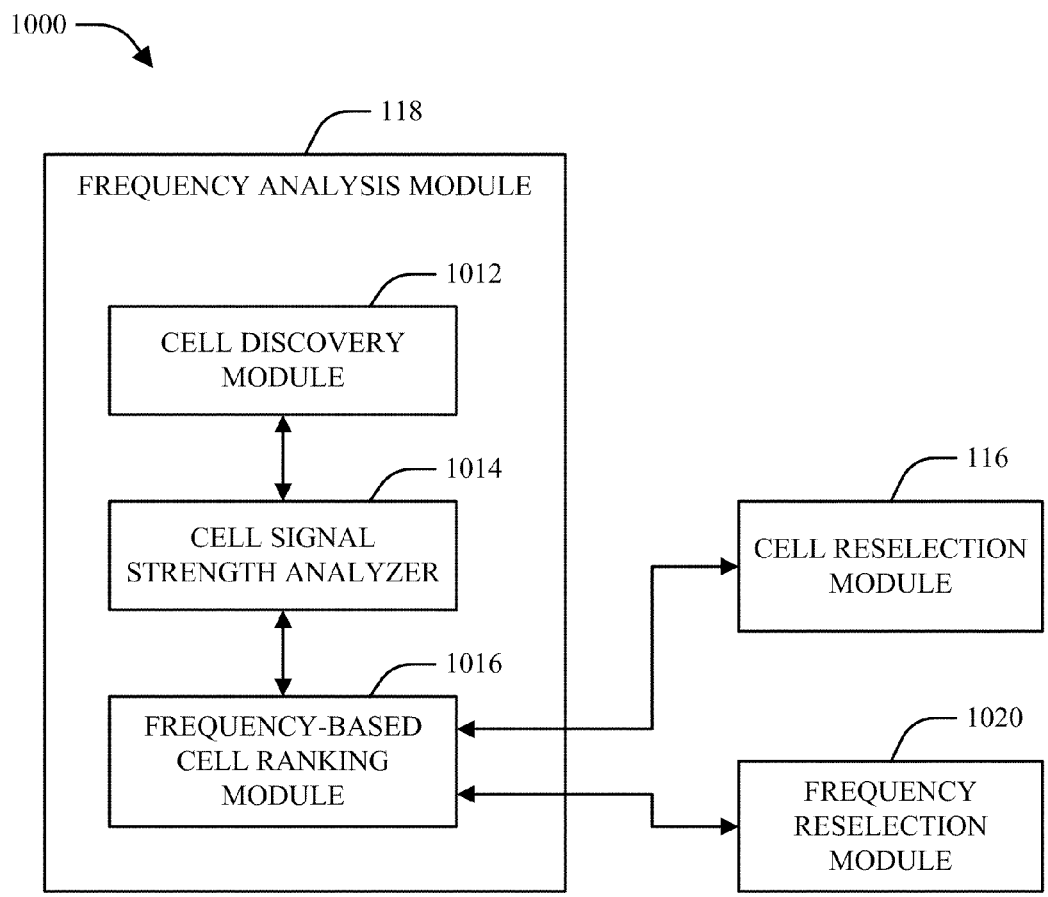
FIG. 10 is a block diagram of a system for performing frequency analysis in connection with cell reselection in accordance with various aspects.

Referring to FIG. 10, a block diagram of a system 1000 for performing frequency analysis in connection with cell reselection in accordance with various aspects is illustrated. System 1000 can include a frequency analysis module 118, which in one example can be utilized to implement "implicit prioritization" of CSGs. More particularly, for implicit prioritization, upon identifying a CSG cell (e.g., a HNB and/or HeNB, taking into account respective models of open or semi-open access on HNBs and/or HeNBs) that is allowed for use, frequency analysis module 118 can automatically treat a frequency at which the CSG cell operates as if it were of higher priority than any previously assigned frequency priorities. Accordingly, if frequency analysis module 118 detects a CSG cell where it is allowed to camp and the measured signal strength from said CSG cell exceeds a predefined system parameter Thresh_x_high, frequency analysis module 118 can facilitate reselection (e.g., via a frequency reselection module 1020 and/or cell reselection module 116) to the frequency utilized by the CSG cell. By performing implicit prioritization in this manner, it can be appreciated that the overall amount of opportunity provided to a user for connecting to a preferred CSG cell and utilizing benefits by the preferred CSG cell (e.g., preferential billing structures, increased range of services, etc.) is increased.

However, it can be appreciated that the above behavior can result in rapid and undesired "ping-pong" reselections between frequencies and/or cells in the event that a CSG cell exceeds Thresh_x_high without being the best cell on its frequency. This can be described in further detail by way of an example as follows. Initially, a UE associated with frequency analysis module 118 can be camped on a given serving cell and frequency and detect (e.g., via a cell discovery module 1012) the presence of a macro cell and CSG cell on a disparate frequency having a lower priority than the serving frequency. If, at a time t1, frequency analysis module 118 observes that the signal strength of the macro cell exceeds Thresh_x_high (e.g., via a cell signal strength analyzer 1014), the associated UE can be configured to take no action as the frequency is of lower priority. Subsequently, if the signal strength of the CSG cell also exceeds Thresh_x_high at a time t2, the implicit priority rule can cause frequency analysis module 118 to treat the frequency at which the CSG cell operates as a high priority frequency such that frequency reselection module 1020 is configured to reselect to the frequency.

Once on the new frequency, however, frequency analysis module 118 can discover that the CSG cell is not actually the best cell on the frequency and that the macro cell is substantially stronger. Thus, cell reselection module 116 can in some cases facilitate reselection to the macro cell on the new frequency. In doing so, however, it can be appreciated that the initial inter-frequency reselection is rendered unnecessary (and in some cases counterproductive, as such a reselection contravenes the frequency hierarchy that the network has imposed on respective macro cells). Further, it can be appreciated that such an approach effectively serves to grant higher priority to all cells operating on a frequency utilized by a CSG cell, when it would be desirable to increase the priority of the CSG cell only.

In accordance with one aspect, frequency analysis module 118 can include a frequency-based cell ranking module 1016, which can prevent gratuitous inter-frequency reselections as described above by implementing a two-step reselection approach. More particularly, frequency analysis module 118 can first determine that the implicit priority rule can be applied for a given frequency (e.g., due to a CSG cell on a given frequency having a signal strength above a predefined threshold as determined by a cell discovery module 1012 and/or a cell signal strength analyzer 1014). Subsequently, frequency-based cell ranking module 1016 can evaluates the cells on the identified frequency in order to determine whether frequency analysis module would actually facilitate camping on the CSG cell after an inter-frequency reselection before determining whether to prioritize the identified. Thus, frequency reselection module 1020 and/or cell reselection module 116 can be configured to perform reselection only if the CSG cell is determined to be the best ranked cell on the identified frequency.

By way of example, a UE associated with frequency analysis module 118 can initially be camped on a frequency f1. Subsequently, cell discovery module 1012 can discover an accessible CSG cell on a frequency f2. If the signal strength of the CSG cell (e.g., as determined by cell signal strength analyzer 1014) is not greater than threshold Thresh_x_high as defined above, frequency analysis module 118 can take no further action. Otherwise, frequency-based cell ranking module 1018 can be employed to evaluate the cells utilizing frequency f2 as if the associated UE was camped on frequency f2. Thus, for example, frequency-based cell ranking module 1018 can be utilized to compute the ranking of cells that would be computed if the associated UE was camped on frequency f2 prior to actually camping on frequency f2. If, based on this cell ranking, the CSG cell is not the highest ranking cell on frequency f2, the associated UE can take no further action, thereby avoiding the double reselection problem noted above. Otherwise, cell reselection module 116 and frequency reselection module 1020 can be utilized to camp the associated UE on frequency f2 and the CSG cell.

Referring now to FIGS. 11-16, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 11:
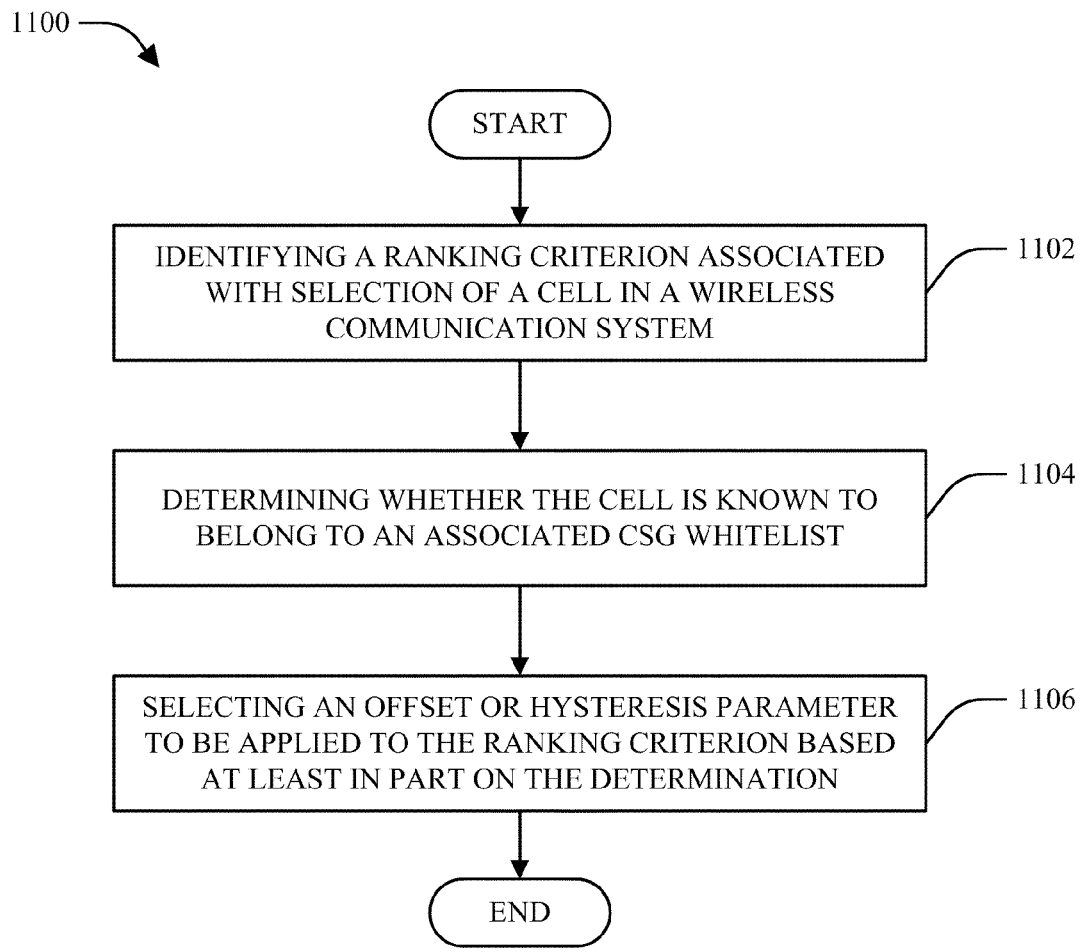
FIGS. 11-13 are flow diagrams of respective methodologies for applying CSG-specific parameters to cell ranking criteria utilized for network cell selection.

With reference to FIG. 11, illustrated is a methodology 1100 for applying CSG-specific parameters to cell ranking criteria utilized for network cell selection. It is to be appreciated that methodology 1100 can be performed by, for example, a UE (e.g., UE 110) and/or any other appropriate network device. Methodology 1100 begins at block 1102, wherein a ranking criterion associated with selection of a cell (e.g., a candidate cell for reselection in an idle mode) in a wireless communication system is identified. At block 1104, it is determined (e.g., by a cell identifier 212) whether the cell is known to belong to an associated CSG whitelist (e.g., CSG whitelist 120). At block 1106, an offset or hysteresis parameter to be applied to the identified ranking criterion (e.g., as applied by a candidate cell ranking module 218 or a hysteresis module 216, respectively) is selected based at least in part on the determination in block 1104.

Figure 12:
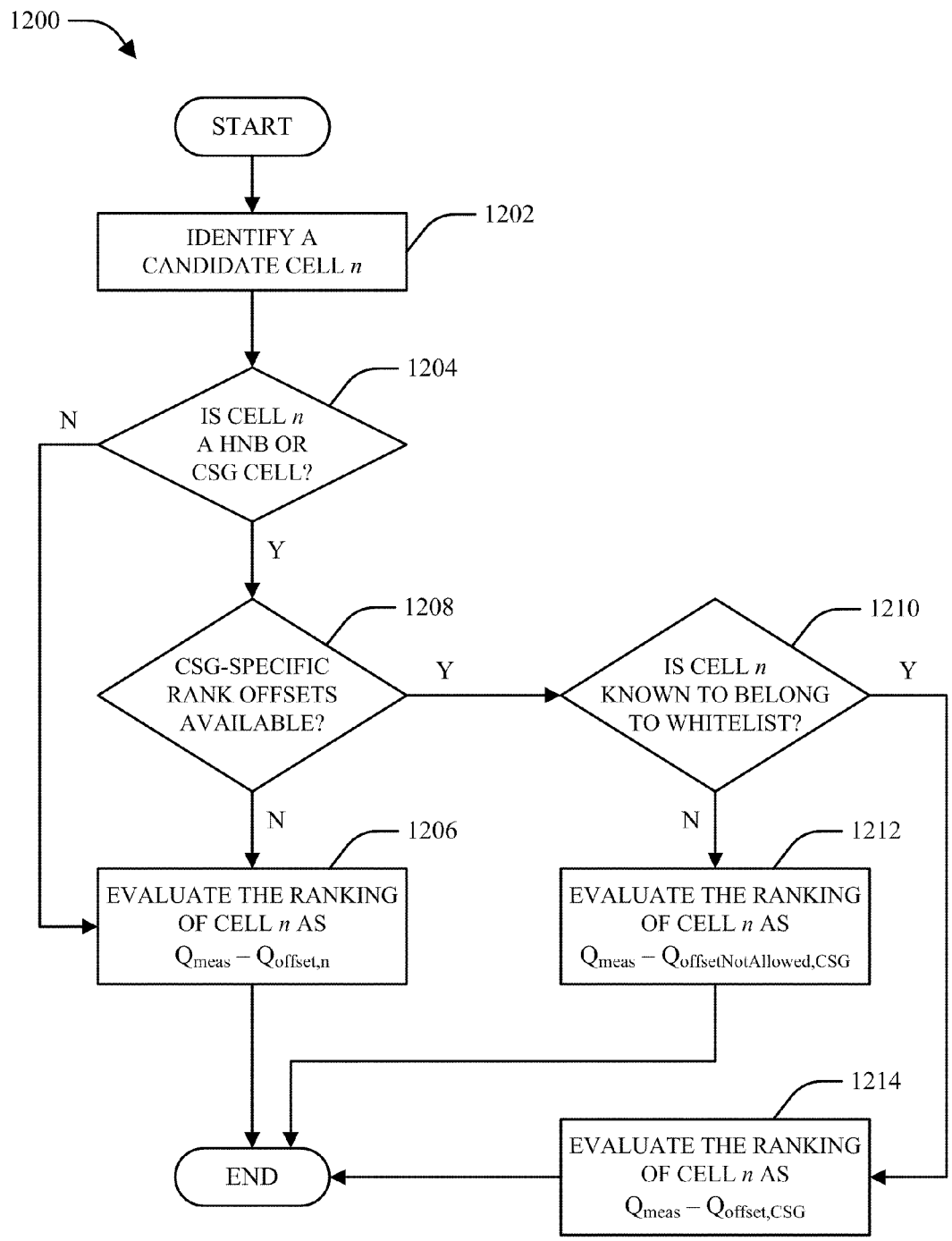

Turning now to FIG. 12, a flow diagram of another methodology 1200 for applying CSG-specific parameters to cell ranking criteria utilized for network cell selection is illustrated. Methodology 1200 can be performed by, for example, a terminal device and/or any other appropriate network entity. Methodology 1200 begins at block 1202, wherein a candidate cell n is identified. Next, at block 1204, it is determined whether cell n is a HNB or CSG cell. If cell n is not a HNB or CSG cell, methodology 1200 concludes at block 1206, wherein the ranking of cell n is computed using system-wide parameters (e.g., $Q_{meas}-Q_{offset,n}$). Otherwise, methodology 1200 can proceed to block 1208, wherein it is determined whether CSG-specific rank offsets are available. If such offsets are not available, methodology 1200 can conclude at block 1206 as described above, or alternatively methodology 1200 can proceed to block 1210 if such offsets are available.

At block 1210, it is determined whether cell n is known to belong to an associated CSG whitelist. The determination at block 1210 can be performed in a variety of manners. For example, a set of identifier values reserved for CSG cells can be received, based on which an entity performing methodology 1200 can attempt to match an identifier value corresponding to cell n to an identifier in the received set and, upon successful matching, read a CSG identifier of the cell in order to determine whether the cell belongs to the CSG whitelist. Alternatively, an entity performing methodology 1200 can obtain a fingerprint signal pattern corresponding to a current location and determine whether the fingerprint signal pattern indicates one or more cells belonging to the associated CSG whitelist. Upon such a determination, CSG identifiers of respective cells within a predefined range, including cell n, can be read to determine whether the respective cells belong to the CSG whitelist.

Upon determining that cell n is not known to belong to the CSG whitelist at block 1210, methodology 1200 can conclude at block 1212, wherein the ranking of cell n is computed using a negative ranking offset (e.g., as $Q_{meas}-Q_{offsetNotAllowed,CSG}$), thereby decreasing a distance from the cell at which reselection to the cell occurs. Alternatively, if cell n is known to belong to the CSG whitelist, methodology 1200 can conclude at block 1214, wherein the ranking of cell n is computed using a positive ranking offset (e.g., as $Q_{meas}-$ $Q_{offsetNotAllowed,CSG}$), thereby increasing a distance from the cell at which reselection to the cell occurs.

Figure 13:
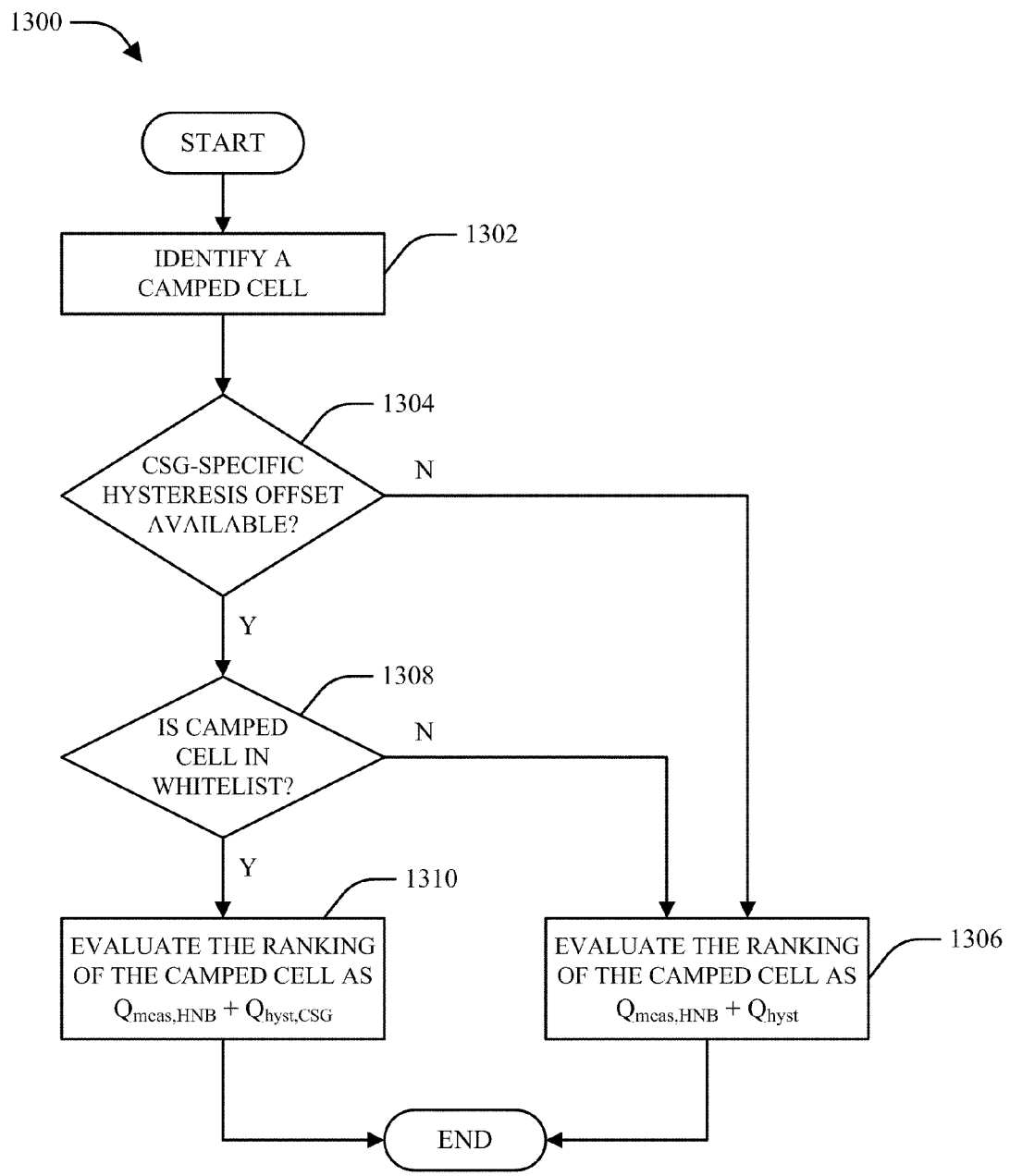

FIG. 13 illustrates a further methodology 1300 for applying CSG-specific parameters to cell ranking criteria utilized for network cell selection. Methodology 1300 can be performed by, for example, a user device and/or any other suitable network device. Methodology 1300 begins at block 1302, wherein a currently camped cell is identified. Next, at block 1304, it is determined whether a CSG-specific hysteresis offset parameter is available. If such a parameter is not available, methodology 1300 concludes at block 1306, wherein the ranking of the camped cell is evaluated using system-wide hysteresis parameters (e.g., as $Q_{meas,HNB}+Q_{hyst}$). Otherwise, methodology 1300 can proceed to block 1308, wherein it is determined whether the camped cell identified at block 1302 is in an associated CSG whitelist. If the camped cell is not in the whitelist, methodology 1300 can conclude at block 1306 as described above. Alternatively, if the camped cell is in the whitelist, methodology 1300 can instead conclude at block 1308, wherein the ranking of the camped cell is evaluated by applying a positive hysteresis parameter (e.g., as $Q_{meas,HNB}+Q_{hyst,CSG}$), thereby increasing a distance from the camped cell at which reselection from the camped cell occurs.

Figure 14:
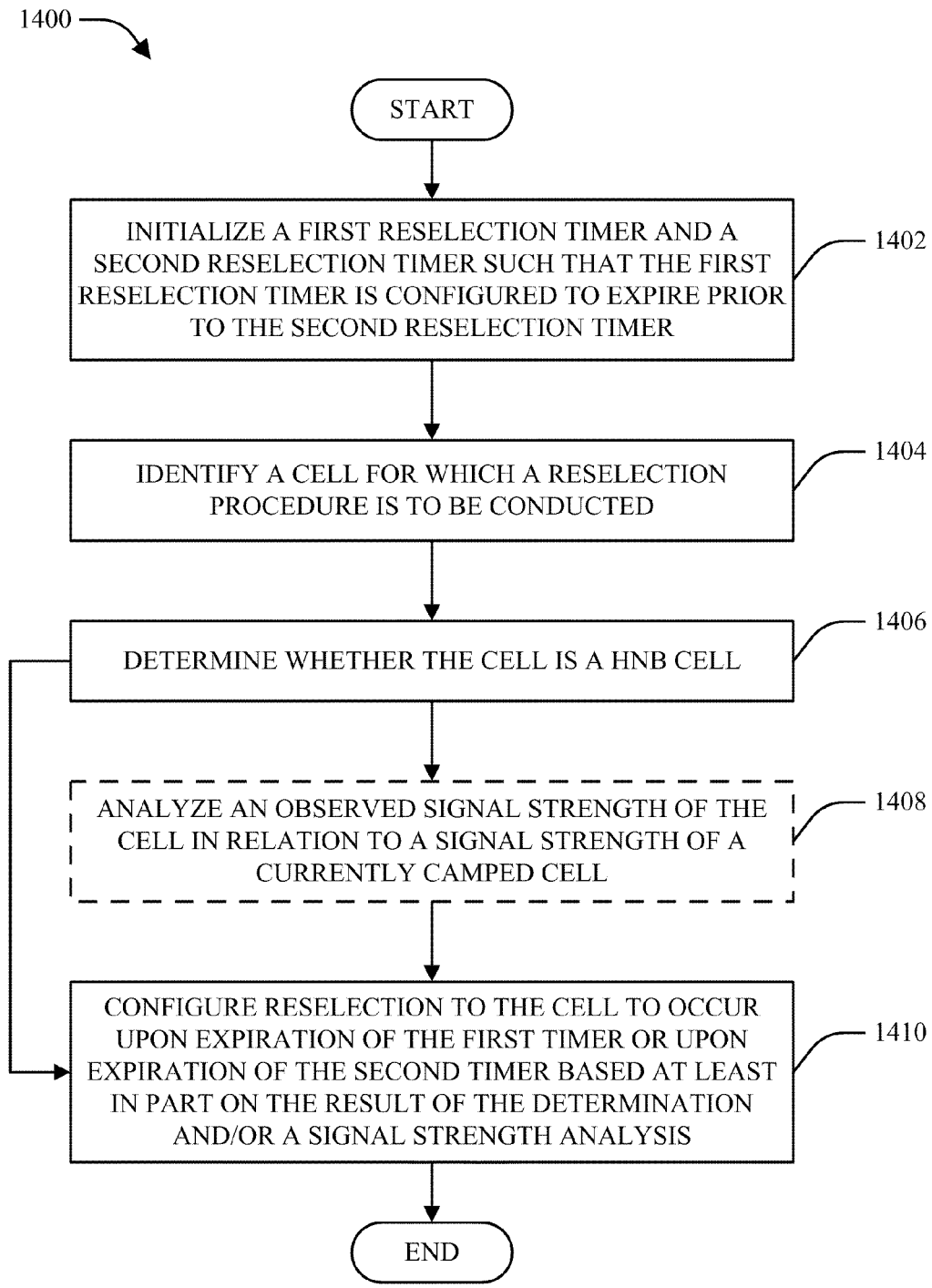
FIG. 14 is a flow diagram of a methodology for configuring and utilizing timing parameters for a network cell reselection operation.

Referring to FIG. 14, illustrated is a methodology 1400 for configuring and utilizing timing parameters for a network cell reselection operation (e.g., via a reselection timing module 116). It is to be appreciated that methodology 1400 can be performed by, for example, a mobile terminal and/or any other appropriate network device. Methodology 1400 begins at block 1402, wherein a first reselection timer (e.g. network reselection delay 812) and a second reselection timer (e.g. HNB reselection delay 814) are initialized such that the first reselection timer is configured to expire prior to the second reselection timer. Next, at block 1404, a cell for which a reselection procedure is to be conducted is identified. At block 1406, it is then determined whether the cell identified at block 1404 is a HNB cell (e.g., a HNB cell or a HeNB cell).

Upon completion of the acts described at block 1406, methodology 1400 can optionally proceed to block 1408, wherein an observed signal strength of the cell identified at block 1404 is analyzed in relation to a signal strength of a currently camped cell (e.g., by a signal strength analyzer 824). In accordance with one aspect, signal strength analysis can be performed at block 1406 based on any suitable technique(s) as described above with relation to signal strength analyzer 824 or otherwise.

Upon execution of the acts described at block 1406 and/or 1408, methodology can conclude at block 1410, wherein reselection to the cell identified at block 1404 is configured to occur upon expiration of the first reselection timer initialized at block 1402 or the second reselection timer initialized at block 1402 based at least in part on the determination at block 1406 (and/or the optional signal strength analysis performed at block 1408). In one example, reselection to the cell can be configured to occur at block 1408 after expiration of the first reselection timer and before expiration of the second reselection timer based on desirability of the cell as determined based on services provided by the cell, signal strength of the cell and/or a currently camped cell, CSG whitelist membership status of the cell, and/or any other suitable factors.

Figure 15:
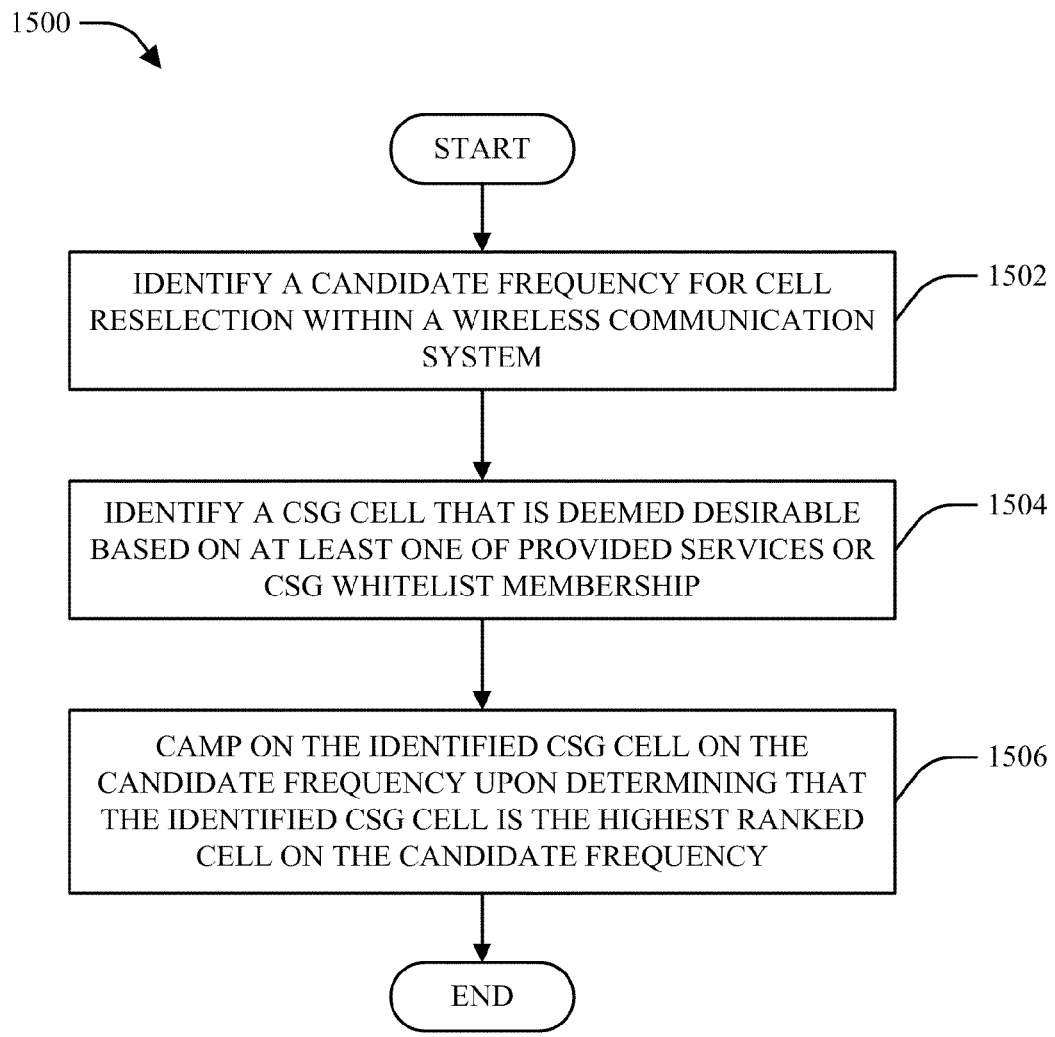
FIG. 15 is a flow diagram of a methodology for prioritizing respective frequencies utilized for network cell camping.

FIG. 15 illustrates a methodology for prioritizing respective frequencies utilized for network cell camping. Methodology 1500 can be performed by, for example, a UE and/or any other appropriate network device. Methodology 1500 begins at block 1502, wherein a candidate frequency for cell reselection within a wireless communication system is identified (e.g. by a frequency analysis module 118). Next, at block 1504, a CSG cell is identified that is deemed desirable based on at least one of services provided by the CSG cell or CSG whitelist membership of the CSG cell. Methodology 1500 can then conclude at block 1506, wherein camping is conducted on the identified cell and the identified frequency (e.g., using a cell reselection module 116 and/or a frequency reselection module 1020) upon determining that the CSG cell identified at block 1504 is the highest ranked cell on the candidate frequency (e.g. as determined by a frequency-based cell ranking module 1016).

Figure 16:
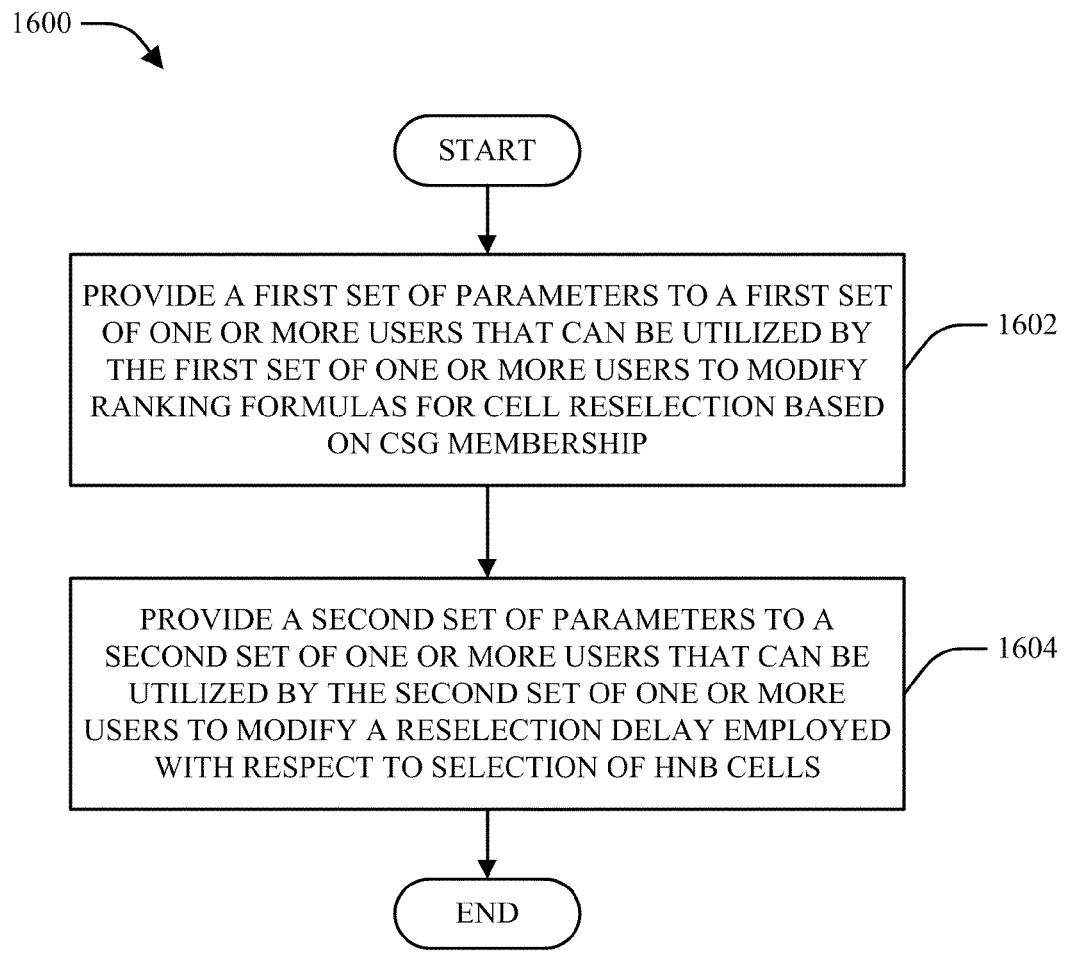
FIG. 16 is a flow diagram of a methodology for communicating respective cell camping and/or selection parameters within a wireless communication system.

Turning to FIG. 16, a flow diagram of a methodology 1600 for communicating respective cell camping and/or selection parameters within a wireless communication system. Methodology 1600 can be performed by, for example, a network cell (e.g., a cell 130) and/or any other suitable network device. Methodology 1600 begins at block 1602, wherein a first set of parameters is provided to a first set of one or more users (e.g., UEs 110) that can be utilized by the first set of one or more users to modify ranking formulas for cell reselection based on CSG membership. For example, the first set of parameters can include offset and/or hysteresis values that can be utilized by respective users to modify a distance from a given network cell at which reselection to or from the cell occurs.

Upon completing the acts described at block 1602, methodology 1600 can conclude at block 1604, wherein a second set of parameters is provided to a second set of one or more users (e.g., that is substantially equivalent to or at least partially non-overlapping with the first set of one or more users) that can be utilized by the second set of one or more users to modify a reselection delay employed with respect to selection of HNB (or HeNB) cells. In accordance with one aspects, the acts described at blocks 1602 and 1604 can be accomplished via unicast transmissions to respective users, broadcast or multicast transmissions to groups of respective users, and/or by any other suitable means.

Referring next to FIGS. 17-20, respective apparatuses 1700-2000 that can be utilized to implement various aspects described herein are illustrated. It is to be appreciated that apparatuses 1700-2000 are represented as including functional blocks, which can be functional blocks that represent functions implemented by a processor, software, or combination thereof (e.g. firmware).

Figure 17:
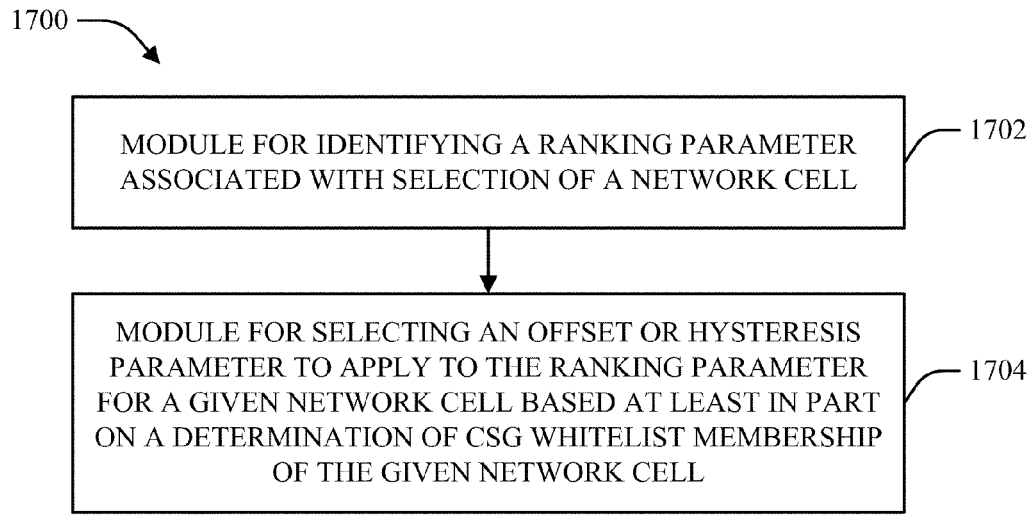
FIGS. 17-20 are block diagrams of respective apparatuses that facilitate improved cell search and/or selection in a wireless communication system.

Turning first to FIG. 17, illustrated is an apparatus 1700 that facilitates improved cell search and selection in a wireless communication system. Apparatus 1700 can be implemented by a UE (e.g. UE 110) and/or another suitable network entity and can include a module 1702 for identifying a ranking parameter associated with selection of a network cell and a module 1704 for selecting an offset or hysteresis parameter to apply to the ranking parameter for a given network cell based at least in part on a determination of CSG whitelist membership of the given network cell.

Figure 18:
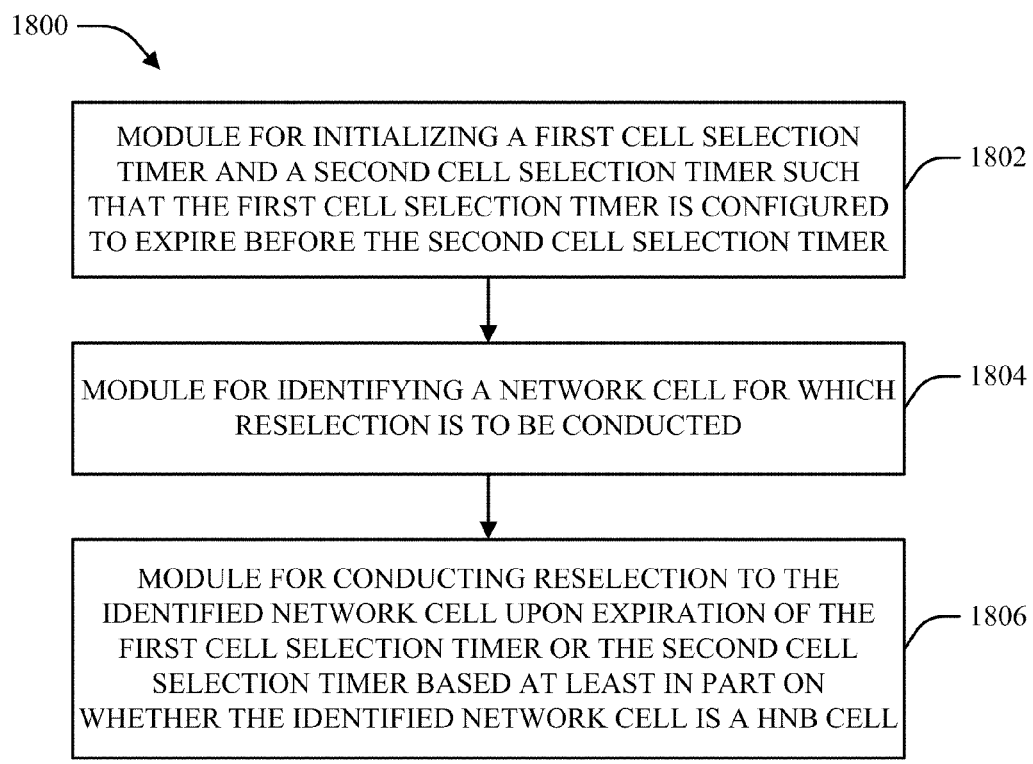

FIG. 18 illustrates a second apparatus 1800 that facilitates improved cell search and selection in a wireless communication system. Apparatus 1800 can be implemented by a terminal device and/or another suitable network entity and can include a module 1802 for initializing a first cell selection timer and a second cell selection timer such that the first cell selection timer is configured to expire before the second cell selection timer, a module 1804 for identifying a network cell for which reselection is to be conducted, and a module 1806 for conducting reselection to the identified network cell upon expiration of the first cell selection timer or the second cell selection timer based at least in part on whether the identified network cell is a HNB cell.

Figure 19:
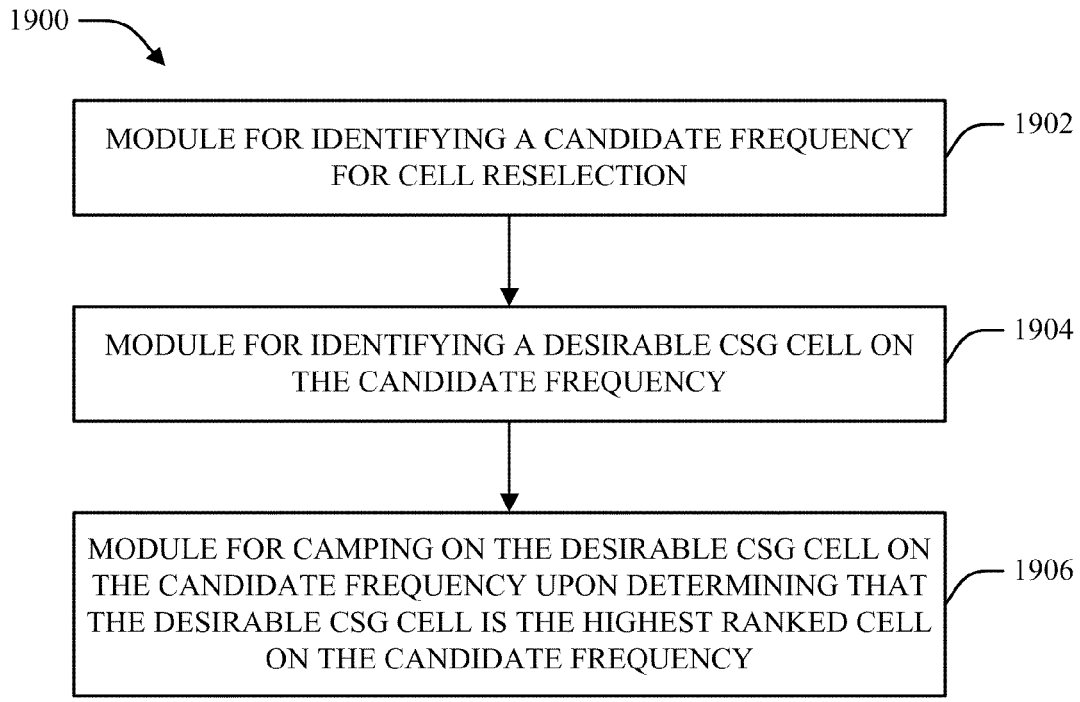

With reference to FIG. 19, illustrated is a third example apparatus 1900 that facilitates improved cell search and selection in a wireless communication system. Apparatus 1900 can be implemented by a UE and/or another suitable network entity and can include a module 1902 for identifying a candidate frequency for cell reselection, a module 1904 for identifying a desirable CSG cell on the candidate frequency, and a module 1906 for camping on the desirable CSG cell on the candidate frequency upon determining that the desirable CSG cell is the highest ranked cell on the candidate frequency.

Figure 20:
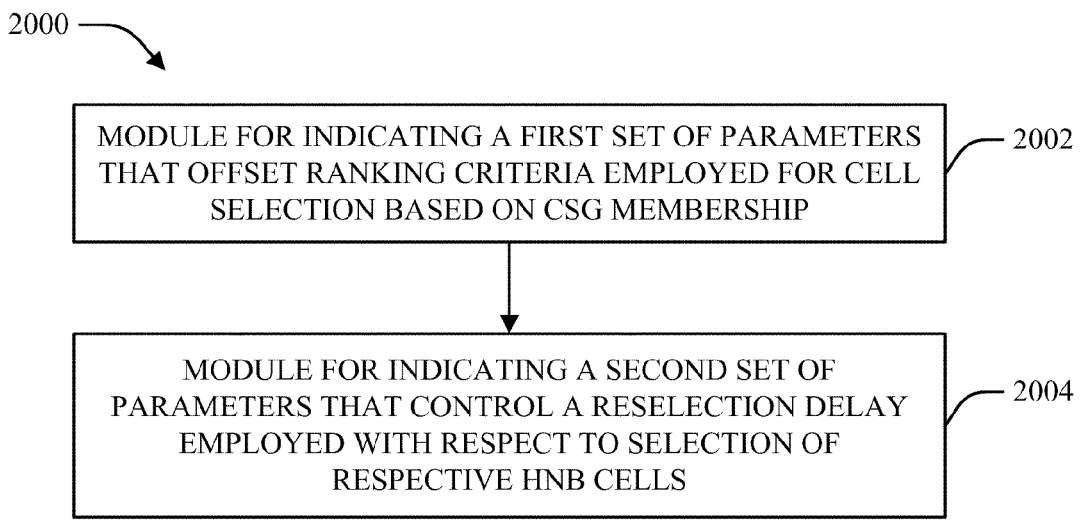

FIG. 20 illustrates a fourth example apparatus 2000 that facilitates improved cell search and selection in a wireless communication system. Apparatus 2000 can be implemented by a network cell (e.g., a cell 130) and/or another suitable network entity and can include a module 2002 for indicating a first set of parameters that offset ranking criteria employed for cell selection based on CSG membership and a module 2004 for indicating a second set of parameters that control a reselection delay employed with respect to selection of respective HNB cells.

Figure 21:
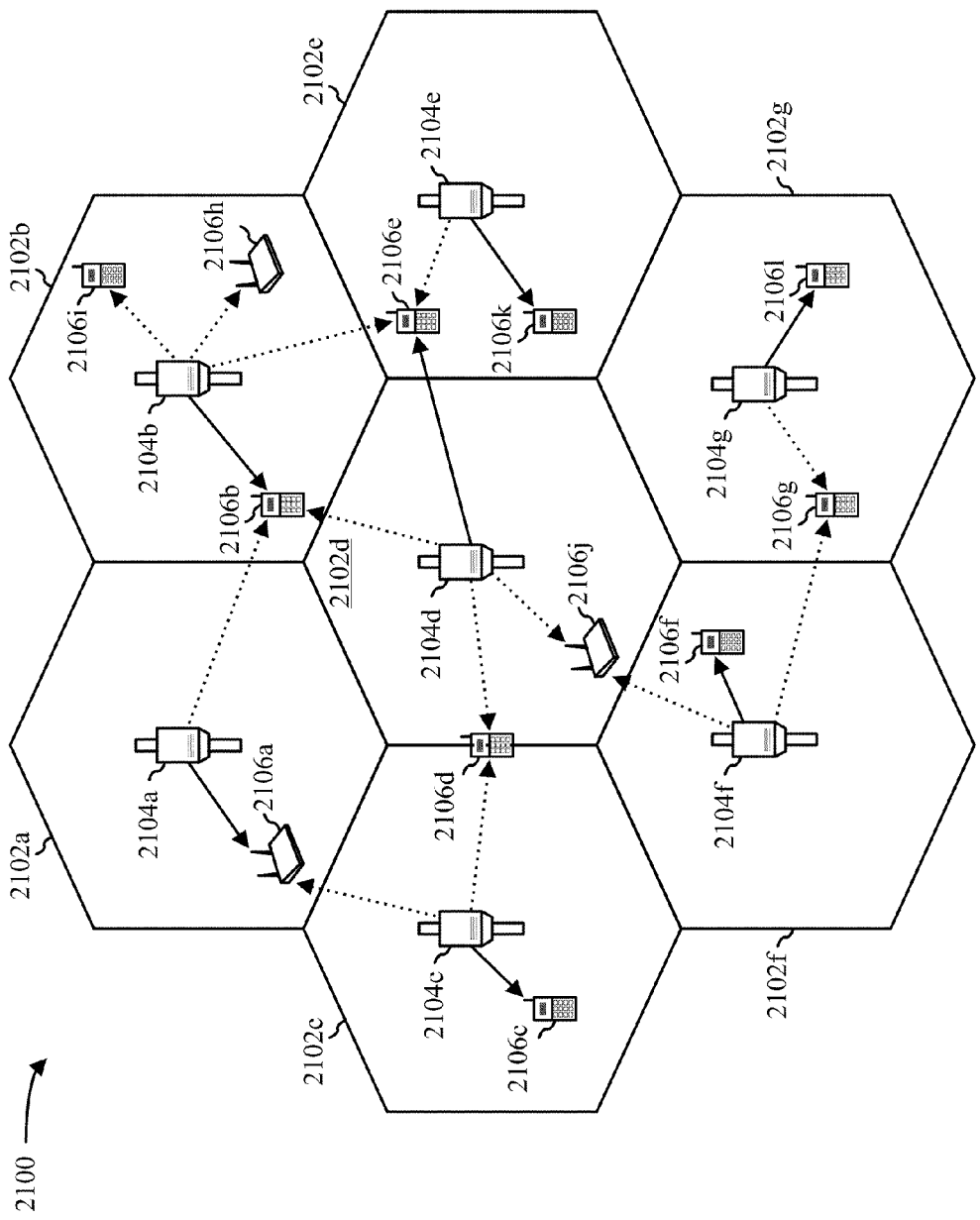
FIG. 21 illustrates an example wireless communication system in accordance with various aspects set forth herein.

Turning next to FIG. 21, an exemplary wireless communication system 2100 is illustrated. In one example, system 2100 can be configured to support a number of users, in which various disclosed embodiments and aspects can be implemented. As shown in FIG. 21, by way of example, system 2100 can provide communication for multiple cells 2102, (e.g., macro cells 2102a-2102g), with respective cells being serviced by corresponding access points (AP) 2104 (e.g., APs 2104a-2104g). In one example, one or more cells can be further divided into respective sectors (not shown).

As FIG. 21 further illustrates, various access terminals (ATs) 2106, including ATs 2106a-2106k, can be dispersed throughout system 2100. In one example, an AT 2106 can communicate with one or more APs 2104 on a forward link (FL) and/or a reverse link (RL) at a given moment, depending upon whether the AT is active and whether it is in soft handoff and/or another similar state. As used herein and generally in the art, an AT 2106 can also be referred to as a user equipment (UE), a mobile terminal, and/or any other suitable nomenclature. In accordance with one aspect, system 2100 can provide service over a substantially large geographic region. For example, macro cells 2102a-2102g can provide coverage for a plurality of blocks in a neighborhood and/or another similarly suitable coverage area.

Figure 22:
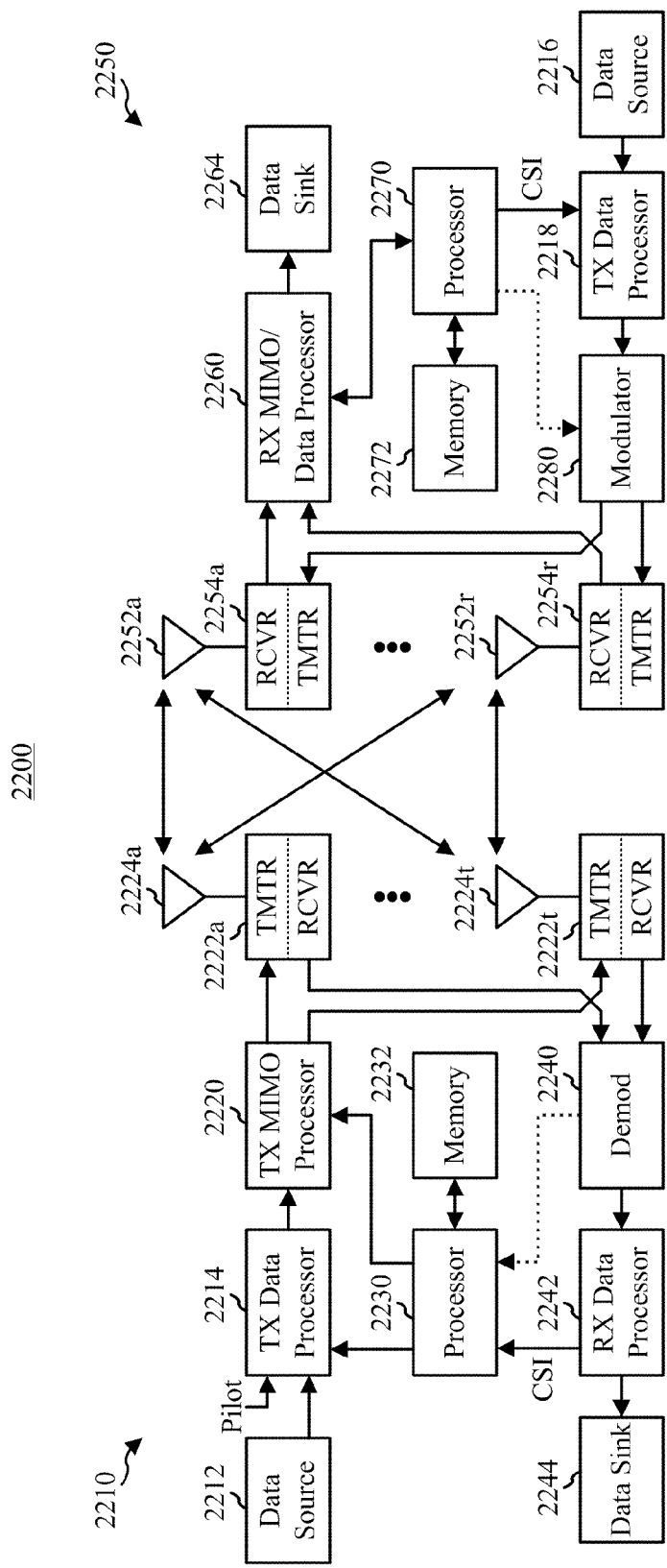
FIG. 22 is a block diagram illustrating an example wireless communication system in which various aspects described herein can function.

Referring now to FIG. 22, a block diagram illustrating an example wireless communication system 2200 in which various aspects described herein can function is provided. In one example, system 2200 is a multiple-input multiple-output (MIMO) system that includes a transmitter system 2210 and a receiver system 2250. It should be appreciated, however, that transmitter system 2210 and/or receiver system 2250 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 2210 and/or receiver system 2250 described herein could be utilized in connection with a single output to single input antenna system.

In accordance with one aspect, traffic data for a number of data streams are provided at transmitter system 2210 from a data source 2212 to a transmit (TX) data processor 2214. In one example, each data stream can then be transmitted via a respective transmit antenna 2224. Additionally, TX data processor 2214 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 2250 to estimate channel response. Back at transmitter system 2210, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 2230.

Next, modulation symbols for all data streams can be provided to a TX processor 2220, which can further process the modulation symbols (e.g., for OFDM). TX MIMO processor 2220 can then provides $N_T$ modulation symbol streams to $N_T$ transceivers 2222a through 2222t. In one example, each transceiver 2222 can receive and process a respective symbol stream to provide one or more analog signals. Each transceiver 2222 can then further condition (e.g., amplify, filter, and upconvert) the analog signals to provide a modulated signal suitable for transmission over a MIMO channel. Accordingly, $N_T$ modulated signals from transceivers 2222a through 2222t can then be transmitted from $N_T$ antennas 2224a through 2224t, respectively.

In accordance with another aspect, the transmitted modulated signals can be received at receiver system 2250 by $N_R$ antennas 2252a through 2252r. The received signal from each antenna 2252 can then be provided to respective transceivers 2254. In one example, each transceiver 2254 can condition (e.g., filter, amplify, and downconvert) a respective received signal, digitize the conditioned signal to provide samples, and then processes the samples to provide a corresponding "received" symbol stream. An RX MIMO/data processor 2260 can then receive and process the $N_R$ received symbol streams from $N_R$ transceivers 2254 based on a particular receiver processing technique to provide $N_T$ "detected" symbol streams. In one example, each detected symbol stream can include symbols that are estimates of the modulation symbols transmitted for the corresponding data stream. RX processor 2260 can then process each symbol stream at least in part by demodulating, deinterleaving, and decoding each detected symbol stream to recover traffic data for a corresponding data stream. Thus, the processing by RX processor 2260 can be complementary to that performed by TX MIMO processor 2220 and TX data processor 2222 at transmitter system 2210. RX processor 2260 can additionally provide processed symbol streams to a data sink 2264.

In accordance with one aspect, the channel response estimate generated by RX processor 2260 can be used to perform space/time processing at the receiver, adjust power levels, change modulation rates or schemes, and/or other appropriate actions. Additionally, RX processor 2260 can further estimate channel characteristics such as, for example, signal-to-noise-and-interference ratios (SNRs) of the detected symbol streams. RX processor 2260 can then provide estimated channel characteristics to a processor 2270. In one example, RX processor 2260 and/or processor 2270 can further derive an estimate of the "operating" SNR for the system. Processor 2270 can then provide channel state information (CSI), which can comprise information regarding the communication link and/or the received data stream. This information can include, for example, the operating SNR. The CSI can then be processed by a TX data processor 2218, modulated by a modulator 2280, conditioned by transceivers 2254a through 2254r, and transmitted back to transmitter system 2210. In addition, a data source 2216 at receiver system 2250 can provide additional data to be processed by TX data processor 2218.

Back at transmitter system 2210, the modulated signals from receiver system 2250 can then be received by antennas 2224, conditioned by transceivers 2222, demodulated by a demodulator 2240, and processed by a RX data processor 2242 to recover the CSI reported by receiver system 2250. In one example, the reported CSI can then be provided to processor 2230 and used to determine data rates as well as coding and modulation schemes to be used for one or more data streams. The determined coding and modulation schemes can then be provided to transceivers 2222 for quantization and/or use in later transmissions to receiver system 2250. Additionally and/or alternatively, the reported CSI can be used by processor 2230 to generate various controls for TX data processor 2214 and TX MIMO processor 2220. In another example, CSI and/or other information processed by RX data processor 2242 can be provided to a data sink 2244.

In one example, processor 2230 at transmitter system 2210 and processor 2270 at receiver system 2250 direct operation at their respective systems. Additionally, memory 2232 at transmitter system 2210 and memory 2272 at receiver system 2250 can provide storage for program codes and data used by processors 2230 and 2270, respectively. Further, at receiver system 2250, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 23:
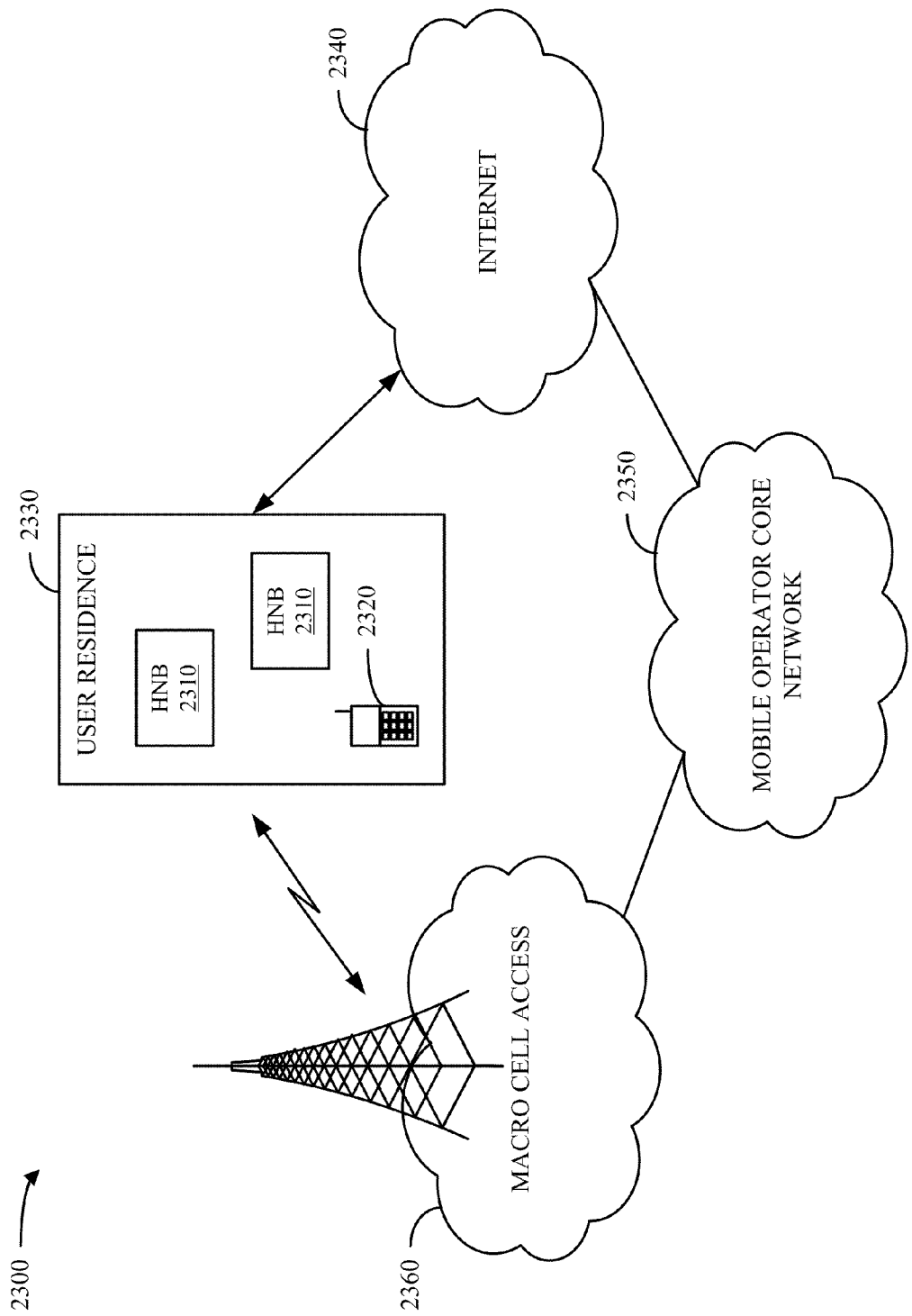
FIG. 23 illustrates an example communication system that enables deployment of access point base stations within a network environment.

FIG. 23 illustrates an example communication system 2300 that enables deployment of access point base stations within a network environment. As shown in FIG. 23, system 2300 can include multiple access point base stations (e.g., femto cells or Home Node B units (HNBs)) such as, for example, HNBs 2310. In one example, respective HNBs 2310 can be installed in a corresponding small scale network environment, such as, for example, one or more user residences 2330. Further, respective HNBs 2310 can be configured to serve associated and/or alien UE(s) 2320. In accordance with one aspect, respective HNBs 2310 can be coupled to the Internet 2340 and a mobile operator core network 2350 via a DSL router, a cable modem, and/or another suitable device (not shown). In accordance with one aspect, an owner of a femto cell or HNB 2310 can subscribe to mobile service, such as, for example, 3G/4G mobile service, offered through mobile operator core network 2350. Accordingly, UE 2320 can be enabled to operate both in a macro cellular environment 2360 and in a residential small scale network environment.

In one example, UE 2320 can be served by a set of Femto cells or HNBs 2310 (e.g., HNBs 2310 that reside within a corresponding user residence 2330) in addition to a macro cell mobile network 2360. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 2310 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a ranking criterion associated with selection of a cell in a wireless communication system;
    determining whether the cell is known to belong to an associated Closed Subscriber Group (CSG) whitelist; and
    selecting at least one of an offset or a hysteresis parameter to be applied to the ranking criterion based at least in part on a result of the determining, wherein a first ranking offset or hysteresis parameter is selected upon determining that the cell is known to belong to the associated CSG whitelist, and a second ranking offset or hysteresis parameter is selected upon determining that the cell is not known to belong to the associated CSG whitelist.

2. The method of claim 1, wherein the cell is a candidate cell for reselection in an idle mode.

3. The method of claim 2, wherein the determining comprises:
    determining whether the candidate cell is a Home Node B (HNB) or a Home Evolved Node B (HeNB); and
    determining that the candidate cell is not known to belong to the associated CSG whitelist upon determining that the candidate cell is not a HNB or a HeNB.

4. The method of claim 1, wherein the determining comprises:
- receiving a set of identifier values reserved for CSG cells;
- attempting to match an identifier value corresponding to the cell to an identifier value in the set of identifier values; and
- upon successful matching of the identifier value corresponding to the cell to an identifier value in the set of identifier values, determining whether the cell is known to belong to the associated CSG whitelist at least in part by reading a CSG identifier (ID) of the cell.

5. The method of claim 1, wherein the determining comprises:
- obtaining a fingerprint signal pattern corresponding to a current location;
- determining whether the fingerprint signal pattern indicates one or more cells belonging to the associated CSG whitelist; and
- upon determining that the fingerprint signal pattern indicates one or more cells belonging to the associated CSG whitelist, reading CSG IDs of respective cells within a predefined range and determining whether the respective cells are known to belong to the associated CSG whitelist based at least in part on the respective CSG IDs.

6. The method of claim 1, wherein the cell is a currently camped cell.

7. The method of claim 1, wherein the selecting comprises selecting a positive ranking offset or hysteresis parameter upon determining that the cell is known to belong to the associated CSG whitelist, thereby increasing a distance from the cell at which reselection to the cell from a disparate cell or reselection from the cell to a disparate cell occurs.

8. The method of claim 1, wherein the selecting comprises selecting a negative ranking offset or hysteresis parameter upon determining that the cell is not known to belong to the associated CSG whitelist, thereby decreasing a distance from the cell at which reselection to the cell from a disparate cell or reselection from the cell to a disparate cell occurs.

9. The method of claim 1, wherein the selecting comprises:
- determining whether one or more CSG-specific offsets are available;
- selecting a CSG-specific offset upon determining that one or more CSG-specific offsets are available; and
- selecting a system-wide offset upon determining that one or more CSG-specific offsets are not available.

10. A wireless communications apparatus, comprising:
- a memory that stores data relating to a network cell, a ranking metric associated with selection of the network cell, and a list of allowed Closed Subscriber Group (CSG) cells; and
- a processor configured to select at least one of an offset or a hysteresis parameter to be applied to the ranking metric associated with selection of the network cell based at least in part on a result of a determination of whether the network cell is known to belong to the list of allowed CSG cells, wherein a first ranking offset or hysteresis parameter is selected upon determining that the cell is known to belong to the associated CSG whitelist, and a second ranking offset or hysteresis parameter is selected upon determining that the cell is not known to belong to the associated CSG whitelist.

11. The wireless communications apparatus of claim 10, wherein the network cell is a candidate cell for reselection in an idle mode.

12. The wireless communications apparatus of claim 10, wherein the processor is further configured to determine whether the network cell is a Home Node B (HNB) or a Home Evolved Node B (HeNB) and to determine that the candidate cell is not known to belong to the list of allowed CSG cells upon determining that the candidate cell is not a HNB or a HeNB.

13. The wireless communications apparatus of claim 10, wherein:
- the memory further stores data relating to identifier values reserved for respective CSG cells; and
- the processor is further configured to attempt matching of an identifier value corresponding to the network cell to an identifier value reserved for a CSG cell stored by the memory and, upon a successful attempt, to determine whether the network cell is known to belong to the list of allowed CSG cells at least in part by reading a CSG identifier (ID) of the network cell.

14. The wireless communications apparatus of claim 10, wherein the processor is further configured to obtain a fingerprint signal pattern corresponding to a current location, to determine whether the fingerprint signal pattern indicates one or more allowed CSG cells within a predefined range of the current location, and, upon determining that the fingerprint signal pattern indicates one or more allowed CSG cells within a predefined range of the current location, to determine whether the network cell is known to belong to the list of allowed CSG cells at least in part by reading a CSG identifier (ID) of the network cell.

15. The wireless communications apparatus of claim 10, wherein the cell is a currently camped cell.

16. The wireless communications apparatus of claim 10, wherein the processor is further configured to select a positive ranking offset or hysteresis parameter upon determining that the network cell is known to belong to the list of allowed CSG cells, thereby increasing a distance from the network cell at which reselection to the network cell from a disparate cell or reselection from the network cell to a disparate cell occurs.

17. The wireless communications apparatus of claim 10, wherein the processor is further configured to select a negative ranking offset or hysteresis parameter upon determining that the network cell is not known to belong to the list of allowed CSG cells, thereby decreasing a distance from the network cell at which reselection to the network cell from a disparate cell or reselection from the network cell to a disparate cell occurs.

18. The wireless communications apparatus of claim 10, wherein the processor is further configured to determine whether one or more CSG-specific offsets are available and to select a CSG-specific offset upon determining that one or more CSG-specific offsets are available or a system-wide offset upon determining that one or more CSG-specific offsets are not available.

19. An apparatus, comprising:
- means for identifying a ranking parameter associated with selection of a network cell; and
- means for selecting an offset or hysteresis parameter to apply to the ranking parameter for a given network cell based at least in part on a determination of Closed Subscriber Group (CSG) whitelist membership of the given network cell, wherein a first ranking offset or hysteresis parameter is selected upon determining that the cell is known to belong to the associated CSG whitelist, and a second ranking offset or hysteresis parameter is selected upon determining that the cell is not known to belong to the associated CSG whitelist.

20. The apparatus of claim 19, wherein the means for selecting comprises:
  means for determining whether the given network cell is a Home Node B (HNB) cell or a Home Evolved Node B (HeNB) cell; and
  means for determining that the given network cell is not known to belong to an associated CSG whitelist upon determining that the given network cell is not a HNB cell or a HeNB cell.

21. The apparatus of claim 19, wherein the means for selecting comprises:
  means for receiving a set of identifier values reserved for respective CSG cells;
  means for attempting to match an identifier value corresponding to the given network cell to an identifier value in the set of identifier values; and
  means for determining whether the given network cell is known to belong to an associated CSG whitelist upon successful matching of the identifier value corresponding to the given network cell to an identifier value in the set of identifier values at least in part by reading a CSG identifier of the given network cell.

22. The apparatus of claim 19, wherein the means for selecting comprises:
  means for obtaining a fingerprint signal pattern corresponding to a current location;
  means for determining whether the fingerprint signal pattern indicates one or more network cells belonging to an associated CSG whitelist within a predefined range; and
  means for determining whether respective cells within the predefined range are known to belong to the associated CSG whitelist at least in part by reading CSG identifiers of the respective cells upon determining that the fingerprint signal pattern indicates one or more cells belonging to the associated CSG whitelist.

23. The apparatus of claim 19, wherein the means for selecting comprises means for selecting a positive ranking offset or hysteresis parameter for a given network cell with known CSG whitelist membership, thereby increasing a distance from the network cell at which reselection to the network cell from a disparate cell or reselection from the network cell to a disparate cell occurs.

24. The apparatus of claim 19, wherein the means for selecting comprises means for selecting a negative ranking offset or hysteresis parameter for a given network cell not known to have CSG whitelist membership, thereby decreasing a distance from the network cell at which reselection to the network cell from a disparate cell or reselection from the network cell to a disparate cell occurs.

25. The apparatus of claim 19, wherein the means for selecting comprises:
  means for determining whether one or more CSG-specific offsets are available;
  means for selecting a CSG-specific offset upon determining that one or more CSG-specific offsets are available; and
  means for selecting a system-wide offset upon determining that one or more CSG-specific offsets are not available.

26. A computer program product, comprising:
  a non-transitory computer-readable medium, comprising:
    code for causing a computer to identify a ranking criterion associated with selection of a cell in a wireless communication system; and
    code for causing a computer to select an offset or hysteresis parameter to apply to the ranking criterion associated with selection of the cell based at least in part on a determination of Closed Subscriber Group (CSG) whitelist membership of the cell, wherein a first ranking offset or hysteresis parameter is selected upon determining that the cell is known to belong to the associated CSG whitelist, and a second ranking offset or hysteresis parameter is selected upon determining that the cell is not known to belong to the associated CSG whitelist.

27. The computer program product of claim 26, wherein the code for causing a computer to select comprises:
  code for causing a computer to determine whether the cell is a Home Node B (HNB) cell or a Home Evolved Node B (HeNB) cell; and
  code for causing a computer to determine that the cell is not known to belong to an associated CSG whitelist upon determining that the cell is not a HNB cell or a HeNB cell.

28. The computer program product of claim 26, wherein the code for causing a computer to select comprises:
  code for causing a computer to identify a set of identifier values reserved for respective CSG cells;
  code for causing a computer to attempt matching of an identifier value for the cell to an identifier value in the set of identifier values; and
  code for causing a computer, upon successful matching of the identifier value for the cell to an identifier value in the set of identifier values, to determine whether the cell is known to belong to an associated CSG whitelist upon at least in part by reading a CSG identifier of the cell.

29. The computer program product of claim 26, wherein the code for causing a computer to select comprises:
  code for causing a computer to obtain a fingerprint signal pattern corresponding to a current location;
  code for causing a computer to determine whether the fingerprint signal pattern indicates one or more network cells belonging to an associated CSG whitelist within a predefined range; and
  code for causing a computer, upon determining that the fingerprint signal pattern indicates one or more cells belonging to the associated CSG whitelist within the predefined range, to determine whether the respective cells are known to belong to the associated CSG whitelist at least in part by reading CSG identifiers of the respective cells.

30. The computer program product of claim 26, wherein the code for causing a computer to select comprises code for causing a computer to select a positive ranking offset or hysteresis parameter for a cell with known CSG whitelist membership, thereby increasing a distance from the cell at which reselection to the cell from a disparate cell or reselection from the cell to a disparate cell occurs.

31. The computer program product of claim 26, wherein the code for causing a computer to select comprises code for causing a computer to select a negative ranking offset or hysteresis parameter for a cell not known to have CSG whitelist membership, thereby decreasing a distance from the cell at which reselection to the cell from a disparate cell or reselection from the cell to a disparate cell occurs.

32. The computer program product of claim 26, wherein the code for causing a computer to select comprises:
  code for causing a computer to determine whether one or more CSG-specific offsets are available; and
  code for causing a computer to select a CSG-specific offset upon determining that one or more CSG-specific offsets are available or a system-wide offset upon determining that one or more CSG-specific offsets are not available.

33. The method of claim 1, wherein the first ranking offset or hysteresis is a positive ranking offset or hysteresis, and the second ranking offset or hysteresis is a negative ranking offset or hysteresis.

34. The wireless communications apparatus of claim 10, wherein the first ranking offset or hysteresis is a positive ranking offset or hysteresis, and the second ranking offset or hysteresis is a negative ranking offset or hysteresis.

* * * * *